United States Patent
Oshima et al.

(10) Patent No.: US 9,930,241 B2
(45) Date of Patent: Mar. 27, 2018

(54) IMAGE PROCESSING APPARATUS, IMAGE PROCESSING PROGRAM, AND IMAGE PROCESSING METHOD

(71) Applicant: Sony Corporation, Tokyo (JP)

(72) Inventors: Shiori Oshima, Kanagawa (JP); Eriko Matsui, Tokyo (JP); Suguru Dowaki, Kanagawa (JP); Tomohiro Hayakawa, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/403,885

(22) PCT Filed: May 17, 2013

(86) PCT No.: PCT/JP2013/003150
§ 371 (c)(1),
(2) Date: Nov. 25, 2014

(87) PCT Pub. No.: WO2013/183233
PCT Pub. Date: Dec. 12, 2013

(65) Prior Publication Data
US 2015/0146081 A1    May 28, 2015

(30) Foreign Application Priority Data
Jun. 7, 2012 (JP) ................. 2012-129466

(51) Int. Cl.
*H04N 5/232* (2006.01)
*G02B 21/36* (2006.01)
*G02B 21/24* (2006.01)
(52) U.S. Cl.
CPC ....... *H04N 5/23212* (2013.01); *G02B 21/244* (2013.01); *G02B 21/367* (2013.01)

(58) Field of Classification Search
CPC . G02B 21/244; G02B 21/367; H04N 5/23212
See application file for complete search history.

(56) References Cited

U.S. PATENT DOCUMENTS 4,902,101 A    2/1990  Fujihara et al.
2005/0082494 A1  4/2005  Motomura

FOREIGN PATENT DOCUMENTS

JP    63-098615    4/1988
JP    05-333271    12/1993
(Continued)

OTHER PUBLICATIONS

International Search Report issued in connection with International Patent Application No. PCT/JP2013/003150, dated Aug. 20, 2013. (1 page).

(Continued)

*Primary Examiner* — Antoinette Spinks
(74) *Attorney, Agent, or Firm* — K&L Gates LLP

(57) ABSTRACT

[Object] To provide an image processing apparatus, an image processing program, and an image processing method capable of obtaining three-dimensional information of an observation target object.
[Solving Means] An image processing apparatus includes a difference calculation unit and a difference distribution generation unit. The difference calculation unit calculates, for each of pixels that constitute a pickup image in each of a plurality of pickup images taken at different focal depths, a difference of a luminance value from an adjacent pixel. A difference image generation unit generates, on the basis of the difference and the focal depth at which the pickup image including the pixel whose difference is calculated is taken, a distribution of the difference with respect to the focal depth.

7 Claims, 21 Drawing Sheets

(56) References Cited

FOREIGN PATENT DOCUMENTS

| JP | H01132251 | 2/1999 |
| JP | 2005-128086 | 5/2005 |
| JP | 2011-090221 | 5/2011 |

OTHER PUBLICATIONS

Extended European Search Report issued in EP Application 13800142.5, dated Mar. 14, 2016, 20 pages.
Chinese Office Action (with English translation) dated Jun. 14, 2016 in corresponding Chinese application No. 2013800286214 (13 pages).

IMAGE PROCESSING APPARATUS, IMAGE PROCESSING PROGRAM, AND IMAGE PROCESSING METHOD

CROSS REFERENCES TO RELATED APPLICATIONS

The present application is a national stage of International Application No. PCT/JP2013/003150 filed on May 17, 2013 and claims priority to Japanese Patent Application No. 2012-129466 filed on Jun. 7, 2012, the disclosure of which is incorporated herein by reference.

BACKGROUND

The present technology relates to an image processing apparatus, an image processing program, and an image processing method for performing image processing for a microscopic image.

When an observation target object is observed by using a microscope, it is necessary to focus the microscope on the observation target object in order to obtain a sharp image. Adjusting a focus while looking at a microscopic image by an observer is a troublesome task. Further, in the case where a living cell or the like is used as an observation target object, the living cell may move with time to be outside of a field of view of a microscope.

If three-dimensional information including a shape, a position, and the like of an observation target object can be automatically obtained, the problem as described above is not caused, and a sharp image of an observation target object can be automatically obtained. Up to now, three-dimensional information of an observation target object can be obtained by using a scanning microscope such as a two-photon excitation laser scanning microscope and a confocal scanning laser microscope. For example, Patent Document 1 discloses a scanning microscope system that receives light obtained by scanning laser light in a light receiver to form a scanning image.

Patent Document 1: Japanese Patent Application Laid-open No. 2005-128086

SUMMARY

Problem to be Solved by the Invention

However, in the scanning microscope system disclosed in Patent Document 1, the laser light is scanned with a point, so increasing speed is difficult. Thus, there is a problem in that the system has poorer versatility as compared to an optical microscope and may give a damage to a cell or the like as the observation target object by the laser.

In addition, for example, for a home camera or the like, a technique such as auto focusing is provided, by which an optimal focal length is automatically detected. This is a technique of detecting a focal length of an object from a contrast of an image. A lot of observation target objects, which are objects to be observed with a microscope, are transparent and have a different relationship between a focal position and a contrast. For this reason, it is difficult to directly apply the auto focusing technique as described above.

Further, in the case where an observation target object is a transparent object (cell or the like), there are influences such as scattering and refraction. Therefore, the sharpest image out of images taken in a focal depth direction (Z direction) does not always correspond to a focal plane. Therefore, it is difficult to quantify the amount of movement of an observation target object in a focal depth direction. When an observation target object moves in a focal depth direction in observation, a focal depth in taking an image has to be corrected accurately. Further, in observation in real time, there is a case where the amount of movement of an observation target object in a focal depth direction is intended to be measured. In addition, it is difficult to quantify the amount of change of a thickness of an observation target object in a focal depth direction. For example, there are cases where spatial cell differentiation is caused, the thickness is changed due to pulsation of a myocardial cell or the like, and the change is desired to be quantified.

In view of the circumstances as described above, an object of the present technology is to provide an image processing apparatus, an image processing program, and an image processing method capable of obtaining three-dimensional information of an observation target object.

Means for Solving the Problem

An image processing apparatus according to an embodiment of the present technology includes a difference calculation unit and a difference distribution generation unit.

The difference calculation unit calculates, for each of pixels that constitute a pickup image in each of a plurality of pickup images taken at different focal depths, a difference of a luminance value from an adjacent pixel.

The difference distribution generation unit generates, on the basis of the difference and the focal depth at which the pickup image including the pixel whose difference is calculated is taken, a distribution of the difference with respect to the focal depth.

Whether the observation target object is adjusted to a proper focal depth (focused) or not can be obtained by a degree of sharpness of an image of the observation target object, that is, the differences of luminances from adjacent pixels. The image processing apparatus generates a distribution of the differences of luminances between the pixels with respect to the focal depths, thereby making it possible to obtain information relating to whether the observation target object exists or not at the focal depth at which the pickup image is taken.

The difference distribution generation unit may include a differential image generation unit to generate, for each of the plurality of pickup images, a differential image obtained by replacing a luminance of the pixel that constitute the pickup image by the difference to generate a plurality of differential images corresponding to the plurality of pickup images, respectively, a luminance totalizing unit to totalize, in each of the plurality of differential images, the luminances of the pixels for each of pixel columns that constitute the differential image to generate a luminance total value for each pixel column, a pixel column generation unit to arrange, for each of the plurality of differential images, the pixels having the luminance total value as the luminance in a first direction in order of the pixel columns to generate a plurality of analysis pixel columns corresponding to the plurality of differential images, respectively, and an image generation unit to arrange the plurality of analysis pixel columns in a second direction perpendicular to the first direction in order of the focal depths at which the plurality of pickup images respectively corresponding to the analysis pixel columns are taken, to generate an analysis image.

The analysis pixel column generated by the pixel column generation unit is obtained by arranging the pixels that a luminance total value for each pixel column is set as a luminance in the differential image in which luminances of the pixels constituting the pickup images are replaced by the differences, that is, obtained by compressing the differential image to the pixel column. Therefore, the image generation unit arranges the analysis pixel columns in order of the focal depths at which the pickup images as a generation source of the analysis pixel columns are taken, thereby making it possible to generate a luminance distribution of the differential image with respect to a focal depth, that is, an analysis image on which the distribution of the luminance differences of the pickup image is reflected.

The difference distribution generation unit may generate, for each of the plurality of pickup images, a differential image obtained by replacing a luminance of the pixel that constitute the pickup image by the difference to generate a plurality of differential images respectively corresponding to the plurality of pickup images, and an image layering unit to layer the plurality of differential images in order of the focal depths at which the plurality of pickup images respectively corresponding to the plurality of differential images are taken.

The image layering unit layers the differential images that the luminances of the pixels constituting the pickup images are replaced by the differences in order of the focal depths at which the pickup images as the generation source are taken, thereby making it possible to generate a luminance distribution of the differential images with respect to the focal depths, that is, the distribution of the luminance differences of the pickup images.

The image processing apparatus may further include an analysis unit to obtain three-dimensional information of an observation target object in a range of the focal depths at which the plurality of pickup images are taken, on the basis of the distribution of the differences generated by the difference distribution generation unit.

The distribution of the luminance differences which is generated by the difference distribution generation unit include information relating to whether the observation target object whose focal depth coincides with the focal depth exists or not. Therefore, the analysis unit analyzes the distribution of the luminance differences, thereby making it possible to obtain information relating to the observation target object for each focal depth, that is, three-dimensional information (size and spatial position of the observation target object) of the observation target object. For example, depending on the size of the observation target object, it is possible to exclude the observation target object from the observation target or detect an amount of movement of the observation target object or a change in thickness thereof.

The image processing apparatus may further include an image pickup control unit to control an image pickup unit that takes an image of the observation target object, on the basis of the three-dimensional information obtained by the analysis unit.

With this structure, the image pickup control unit uses the three-dimensional information of the observation target object, with the result that it is possible to take an image of the observation target object by the image pickup unit. Therefore, it is also possible to control the image pickup unit to cause the observation target object set as the observation target by the analysis unit to have a focal depth and a range of field of view suitable for observation.

The image pickup unit may take the plurality of pickup images through an optical microscope.

As described above, the image processing apparatus according to the present technology can obtain the three-dimensional information of the observation target object by the image processing, and does not require a special structure unlike a laser scanning microscope. Thus, the image processing apparatus has high versatileness and can detect the three-dimensional information at relatively high speed, and therefore is suitable for observation of an observation target object damaged by laser irradiation, for example, a living cell or the like.

An image processing program according to another embodiment of the present technology causes a computer to function as a difference calculation unit and a difference distribution generation unit.

The difference calculation unit calculates, for each of pixels that constitute a pickup image in each of a plurality of pickup images taken at different focal depths, a difference of a luminance value from an adjacent pixel.

The difference distribution generation unit generates, on the basis of the difference and the focal depth at which the pickup image including the pixel whose difference is calculated is taken, a distribution of the difference with respect to the focal depth.

In an image processing method according to another embodiment of the present technology, a difference calculation unit calculates, for each of pixels that constitute a pickup image in each of a plurality of pickup images taken at different focal depths, a difference of a luminance value from an adjacent pixel.

A difference distribution generation unit generates, on the basis of the difference and the focal depth at which the pickup image including the pixel whose difference is calculated is taken, a distribution of the difference with respect to the focal depth.

Effect of the Invention

As described above, according to the present technology, it is possible to provide the image processing apparatus, the image processing program, and the image processing method capable of obtaining the three-dimensional information of the observation target object.

Additional features and advantages are described herein, and will be apparent from the following Detailed Description and the figures.

DETAILED DESCRIPTION

First Embodiment

Figure 1:
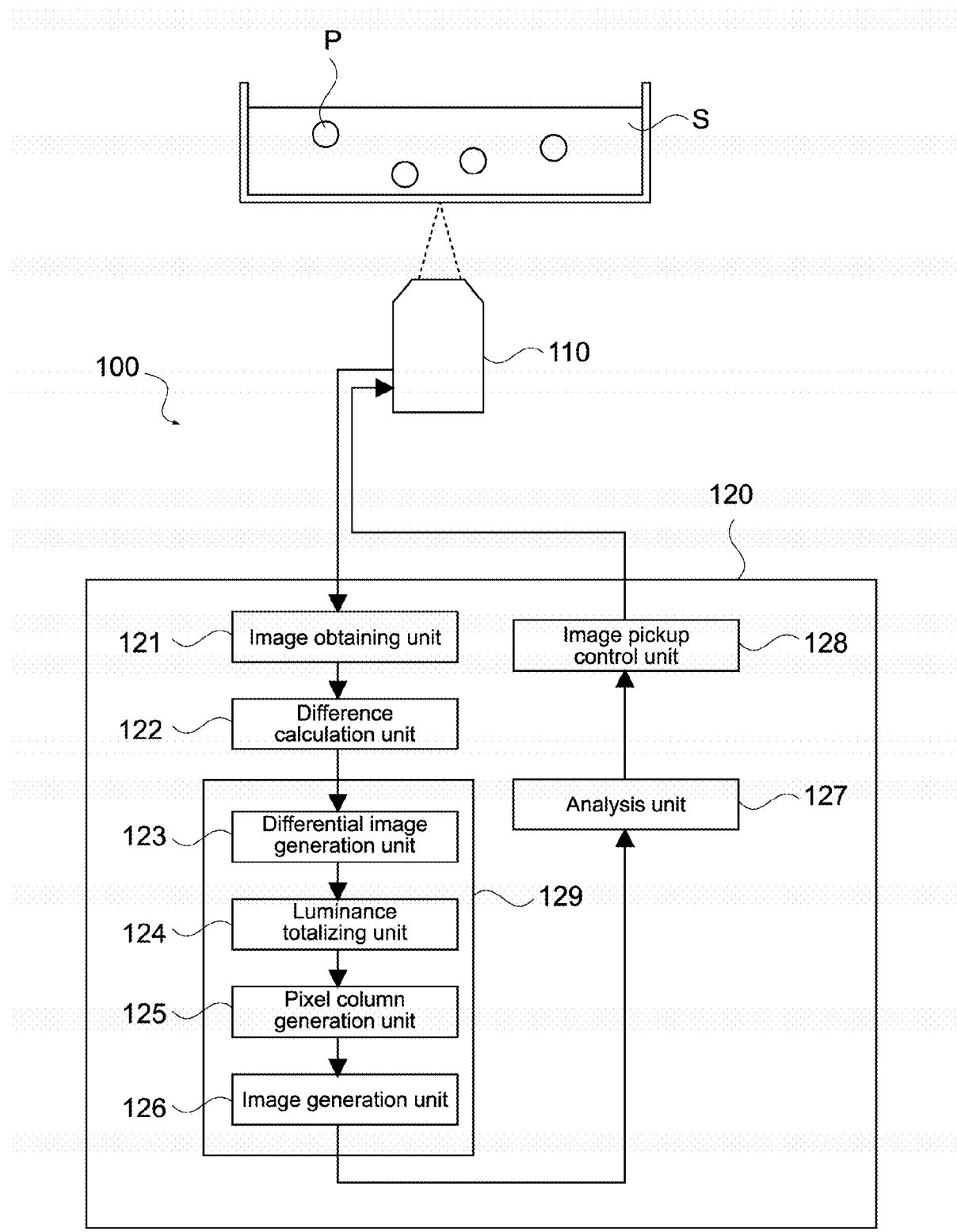
FIG. 1 A schematic diagram showing the structure of an image processing apparatus according to a first embodiment of the present technology.

An image processing apparatus according to a first embodiment of the present technology will be described. FIG. 1 is a schematic diagram showing the structure of an image processing apparatus 100.

[Structure of Image Processing Apparatus]

As shown in the figure, the image processing apparatus 100 includes an image pickup unit 110 and an image processing unit 120. The image pickup unit 110 is an optimal microscope such as a bright field microscope and a phase difference microscope, and the image processing unit 120 can be an information processing apparatus such as a personal computer. It should be noted that the image processing unit 120 may be formed integrally with the image pickup unit 110.

In FIG. 1, an observation sample S is shown. The observation sample S is not particularly limited, but the observation sample S can include a cell contained in a culture container with a culture solution. Hereinafter, the cell is set as an observation target object to be observed by an observer, observation target object P. In this embodiment, the observation target object P can be transparent or translucent. Generally, a body tissue having a size like a cell is transparent or translucent.

The image pickup unit 110 takes an image of the observation sample S. The image pickup unit 110 is provided with at least a microscope optical system and an image pickup device such as a CCD (Charge Coupled Device) image sensor and is capable of taking a microscopic image of the observation sample S. Here, the image pickup unit 110 can change a focal depth (depth of a focal plane at the observation sample S) thereof. The focal depth may be adjusted by the microscope optical system or may be changed by a relative position of the image pickup unit 110 and the observation sample S. The image pickup unit 110 outputs the image taken (hereinafter, referred to as pickup image) and the focal depth at which the image is taken to image processing unit 120.

The image processing unit 120 includes an image obtaining unit 121, a difference calculation unit 122, a differential image generation unit 123, a luminance totalizing unit 124, a pixel column generation unit 125, an image generation unit 126, an analysis unit 127, and an image pickup control unit 128. The differential image generation unit 123, the luminance totalizing unit 124, the pixel column generation unit 125, and the image generation unit 126 constitute a difference distribution generation unit 129. Those components can be a functional structure achieved by hardware and software in cooperation with each other. It should be noted that the outline of the components of the image processing unit 120 will be described here, and details thereof will be described with an explanation of an operation of the image processing apparatus 100.

The image obtaining unit 121 obtains a plurality of pickup images (hereinafter, pickup image group) taken at different focal depths from the image pickup unit 110. At this time, the image obtaining unit 121 obtains the focal depths, at which the pickup images are taken, along with the pickup images. The image obtaining unit 121 supplies the pickup image group and the focal depths at which the pickup images are taken to the difference calculation unit 122.

In the pickup images, for each of the pixels that constitute the pickup images, the difference calculation unit 122 calculates a difference in luminance (hereinafter, simply referred to as difference) from an adjacent pixel. The difference calculation unit 122 calculates the difference for all the pickup images included in the pickup image group. The difference calculation unit 122 supplies the calculated differences and position coordinates of the pixels in the pickup images to the differential image generation unit 123.

On the basis of the differences calculated by the difference calculation unit 122 and the focal depth at which each of the pickup images including the pixels whose differences are calculated, the difference distribution generation unit 129 generates a distribution of the differences with respect to the focal depth. Specifically, the difference distribution generation unit 129 is capable of having the following structure.

The differential image generation unit 123 generates a differential image obtained by replacing the luminances of the pixels that constitute the pickup images by the differences calculated by the difference calculation unit 122. The differential image generation unit 123 generates the differential images for all the pickup images included in the pickup image group. The differential image generation unit 123 supplies the generated differential images to the luminance totalizing unit 124.

In the differential images, the luminance totalizing unit 124 totalizes the luminances of the pixels for each pixel column that constitute the differential images and calculates a total value of the luminances (hereinafter, luminance total value) for each pixel column. The pixel column is a column of the pixels that constitute the differential image and will be described later in detail. The luminance totalizing unit 124 calculates the luminance total value for each of the differential images supplied from the differential image generation unit 123. The luminance totalizing unit 124 supplies the calculated luminance total values to the pixel column generation unit 125.

For each differential image, the pixel column generation unit 125 arranges the pixels that the luminance total value for each pixel column is set as the luminance in order of the pixel columns in the differential image, thereby generating an analysis pixel column. As a result, from each of the differential images, one analysis pixel column is generated, that is, from each pickup image, one analysis pixel column is generated. The pixel column generation unit 125 supplies the analysis pixel columns to the image generation unit 126.

The image generation unit 126 arranges the analysis pixel columns generated in the pickup images, thereby generating an analysis image. At this time, the image generation unit 126 carries out the arrangement in order of the focal depths at which the pickup images are taken to which the differential images as the generation sources of the analysis pixel columns correspond. As a result, from the pickup image group, one analysis image is generated. The image generation unit 126 can supply the generated analysis image to the analysis unit 127.

As described above, the difference distribution generation unit 129 has the differential image generation unit 123, the luminance totalizing unit 124, the pixel column generation unit 125, and the image generation unit 126 and generates a distribution of the differences with respect to the focal depths as the analysis image. However, the difference distribution generation unit 129 may not necessarily have those structures, as long as the difference distribution generation unit 129 is capable of generating the distribution of the differences of the pickup images with respect to the focal depths.

On the basis of the distribution of the differences with respect to the focal depths (in this embodiment, the analysis image), the analysis unit 127 obtains three-dimensional information (size, three-dimensional position, and the like) of the observation target object P. For example, the analysis unit 127 can exclude the object depending on the size of the observation target object P from the observation target or can detect the amount of movement of the observation target object P. The analysis unit 127 can supply the three-dimensional information of the observation target object P, which is determined to be observed, to the image pickup control unit 128.

On the three-dimensional information supplied from the analysis unit 127, the image pickup control unit 128 controls the image pickup unit 110 to take an observation image. The image pickup control unit 128 uses the three-dimensional information supplied from the analysis unit 127, thereby controlling the focal depth, a range of field of view, and the like of the image pickup unit 110, with the result that it is possible to take an image of the observation target object P suitable for the observation.

[Operation of Image Processing Apparatus]

Figure 2:
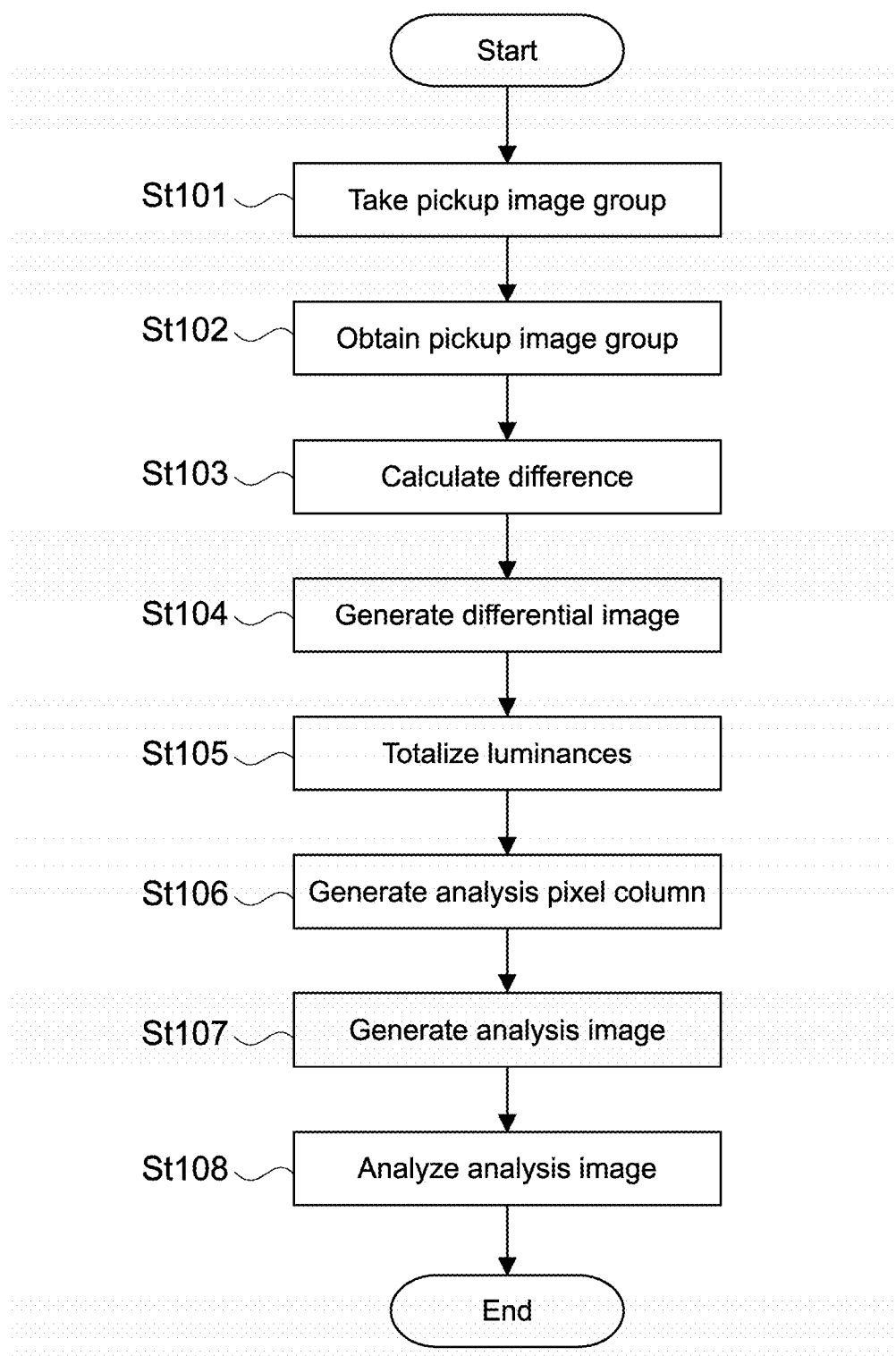
FIG. 2 A flowchart showing an operation of the image processing apparatus.

An operation of the image processing apparatus 100 will be described. FIG. 2 is a flowchart showing the operation of the image processing apparatus 100.

By the image pickup control unit 128, the image pickup unit 110 is controlled to take a plurality of pickup images (pickup image group) (St101). It should be noted that the pickup image group may be obtained by an observer.

Figure 3:
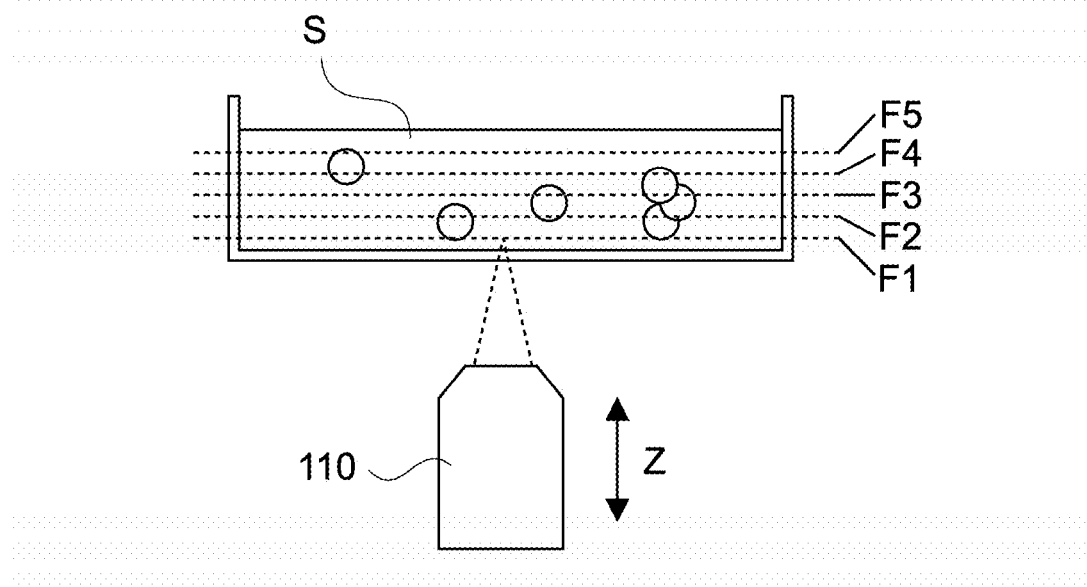
FIG. 3 A schematic diagram showing a focal depth at which pickup images are obtained in the image processing apparatus.

The pickup image group is constituted of the plurality of pickup images taken at different focal depths. FIG. 3 is a schematic diagram showing focal depths (focal depths F1 to F5 as examples) at which the pickup images are obtained. By the image pickup control unit 128 or by the observer, the image pickup unit 110 is controlled, and the focal depth of the image pickup unit 110 is adjusted to the focal depths to take the images. In the following description, the focal depth direction is set as a Z direction. It is desirable that the focal depths are set at certain intervals, for example, intervals of several μm, but can be changed as appropriate depending on the size or the like of the observation target object P. The range of the focal depths, that is, the range in which the pickup image group is taken can be changed as appropriate depending on the size or the like of the observation sample S, for example, a range in which it is determined in advance that the observation target object P does not exist can be excluded from the range of the focal depths.

Figure 4:
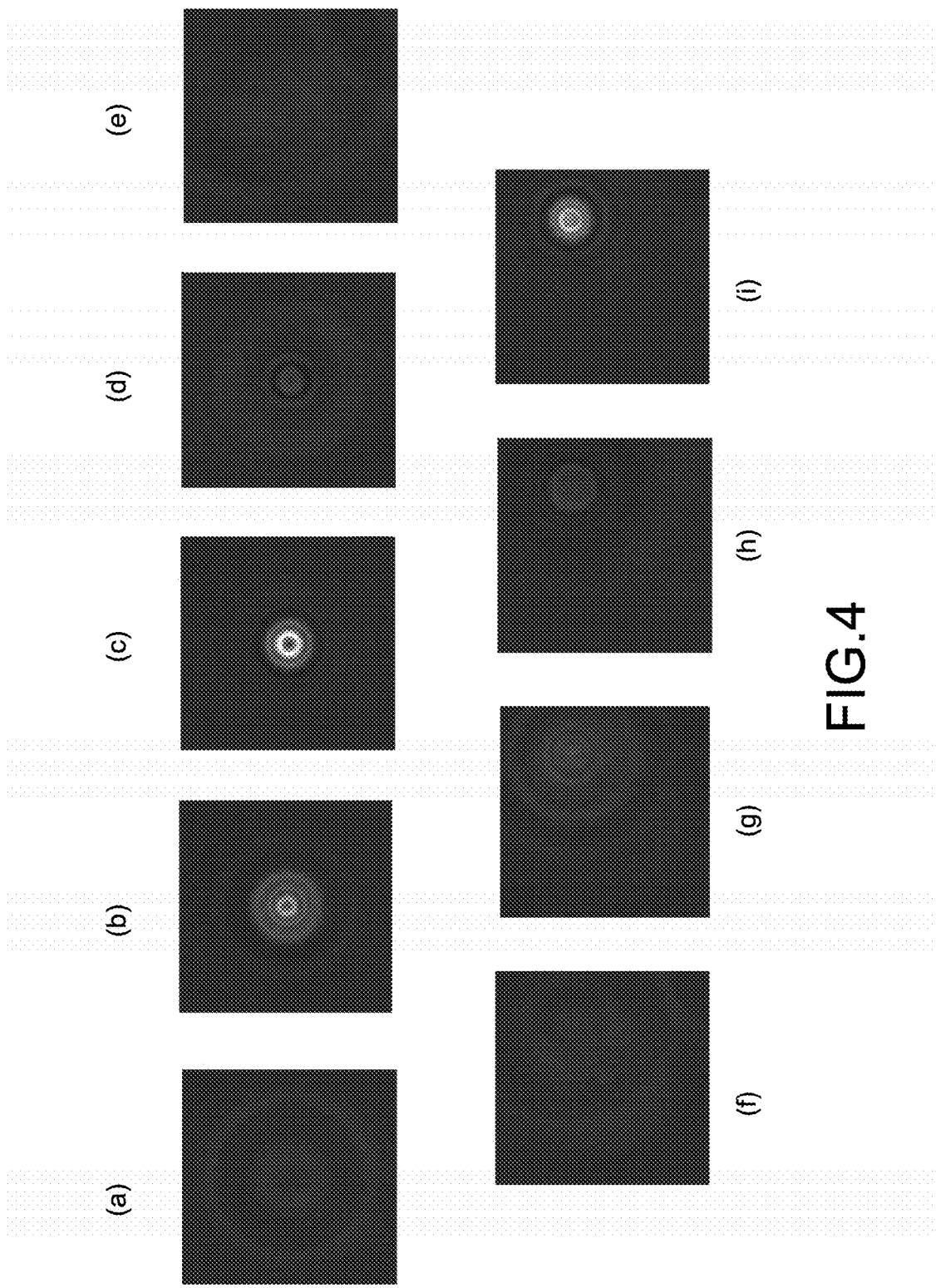
FIG. 4 A diagram showing an example of a pickup image group taken by an image pickup unit of the image processing apparatus.
Figure 5:
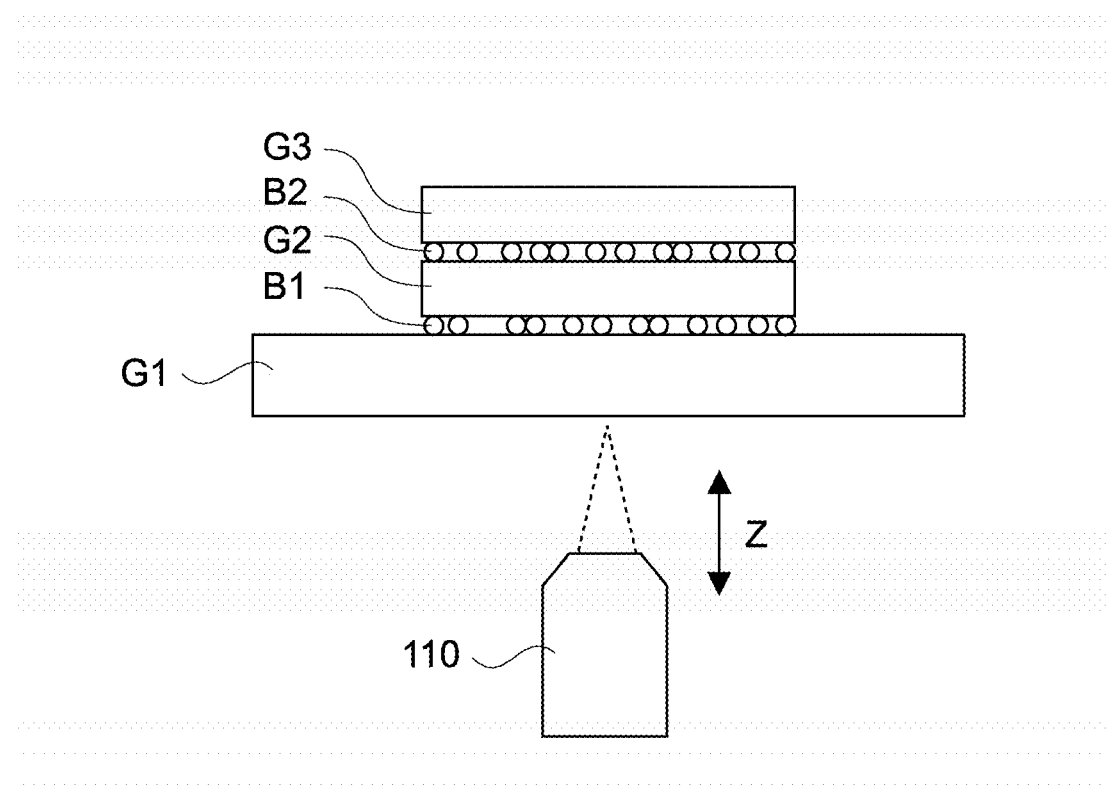
FIG. 5 A schematic diagram showing an experiment system in which the pickup image group shown in FIG. 4 is taken.

FIG. 4 shows an example of the pickup image group taken by the image pickup unit 110, and FIG. 5 shows an experiment system in which the pickup image group shown in FIG. 4 is obtained. The experiment system shown in FIG. 5 is obtained by layering, on a glass slide G1, a bead layer B1, a cover glass G2, a bead layer B2, and a cover glass G3 in this order. The bead layer B1 and the bead layer B2 are each formed of transparent beads each having a diameter of 6 μm, and the thicknesses of the cover glass G2 and the cover glass G3 are 100 μm. In the experiment system, a transparent cell in a culture solution as shown in FIG. 1 is simulated.

FIG. 4(*a*) to FIG. 4(*i*) show examples of the pickup images taken at predetermined focal depths. In FIG. 4(*c*), the focal depth coincides with the bead layer B1, and in FIG. 4(*i*), the focal depth coincides with the bead layer B2. In the figures, a sharp transparent bead image is obtained. On the other hand, in the other pickup images, the focal depth does not coincide with the bead layer B1 or the bead layer B2, so the image of the transparent bead is not sharp. In the following description, the images taken in the experiment system described above are used.

Figures 6, 7:
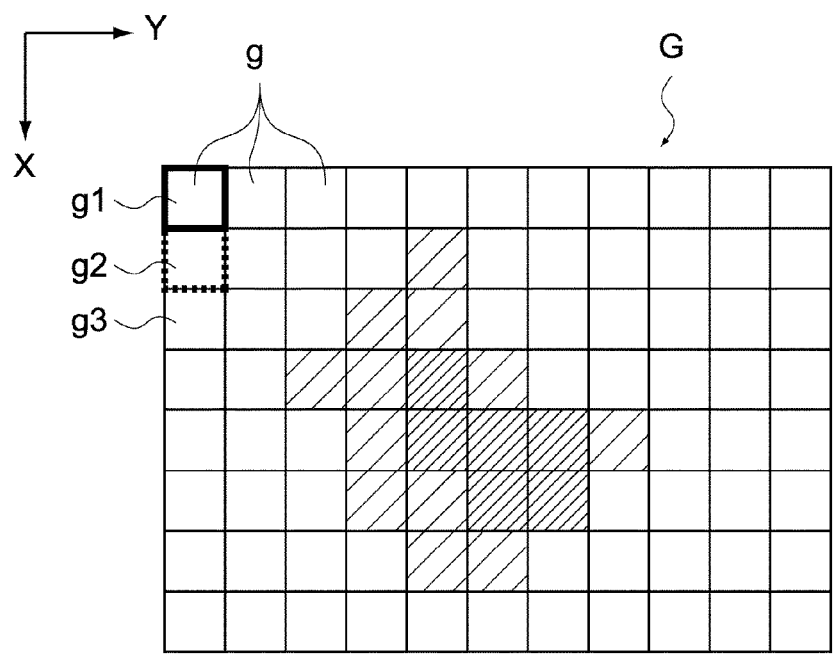
FIG. 6 A schematic diagram showing a pickup image taken by the image pickup unit of the image processing apparatus.
FIG. 7 A schematic diagram showing differences in luminance of pixels, which are calculated by a difference calculation unit of the image processing apparatus.

Subsequently, with reference to FIG. 2 again, the image obtaining unit 121 obtains the pickup image group from the image pickup unit 110 (St102). In addition, the difference calculation unit 122 calculates, for each of the pickup images, the difference of the luminance of each of the pixels that constitute the pickup images (St103). FIG. 6 is a schematic diagram showing the pickup image (pickup image G). As shown in the figure, the pickup image G is constituted of a plurality of pixels g. In FIG. 6, the luminances of the pixels g are schematically shown with the level of density of diagonal lines. In the following description, a short side direction of the pickup image G is set as an X direction, and a long side direction thereof is set as a Y direction.

The difference calculation unit 122 can calculate the difference of the luminance of the pixels g from the pixel g adjacent thereto in a predetermined direction (for example, X direction) out of the adjacent pixels g. For example, the difference calculation unit 122 calculates a difference of a pixel g1 from a pixel g2 adjacent thereto in the X direction. Further, the difference calculation unit 122 calculates a difference of the pixel g2 from a pixel g3 adjacent thereto in the X direction. In this way, the difference calculation unit 122 calculates differences of luminances of the other pixels g included in the pickup image G from an adjacent pixel g in the same direction (X direction).

FIG. 7 is a schematic diagram showing the differences of the pixels g from the adjacent pixels g, which are calculated by the difference calculation unit 122, with the differences corresponded to the pixels g. As shown in the figure, the difference of the pixel g adjacent to the pixel g (light diagonal lines) having a small luminance becomes small (for example, 50), and the difference of the pixel g adjacent to the pixel having a large luminance (dense diagonal lines) becomes large (for example, 100).

Figure 8:
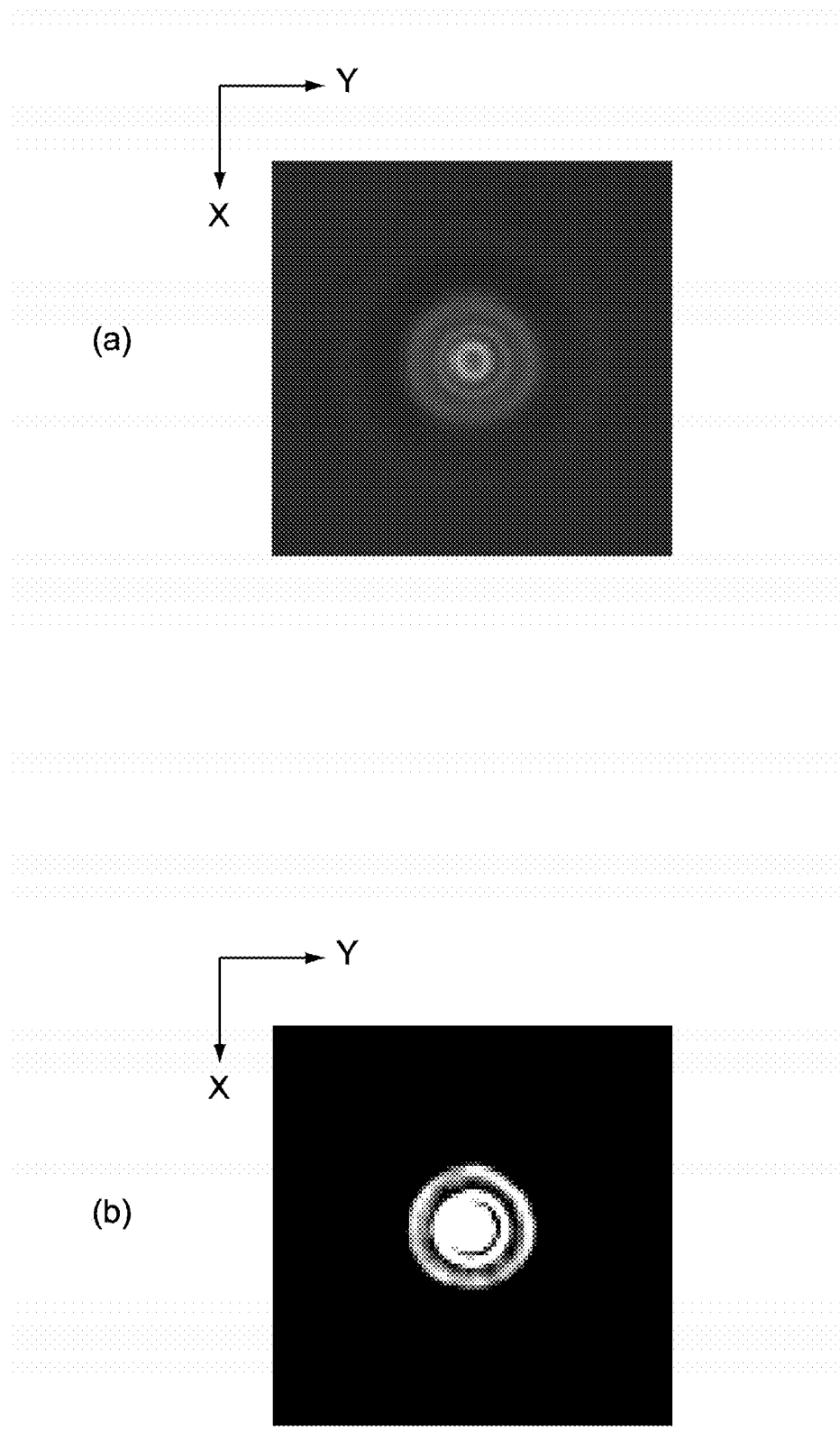
FIG. 8 A diagram showing examples of a differential image generated by a differential image generation unit of the image processing apparatus.

Subsequently, with reference to FIG. 2 again, the differential image generation unit 123 replaces the luminances of the pixels g in the pickup image G by the differences calculated for the pixels g, thereby generating a differential image (St104). FIG. 8 is a diagram showing an example of the differential image. FIG. 8(*a*) is a pickup image, FIG. 8(*b*) is the differential image generated by the pickup image. As shown in FIG. 8(*b*), in the differential image, as compared to the pickup image, a periphery (outline) of an image of a detection target object (here, transparent bead) is clear.

Figure 9:
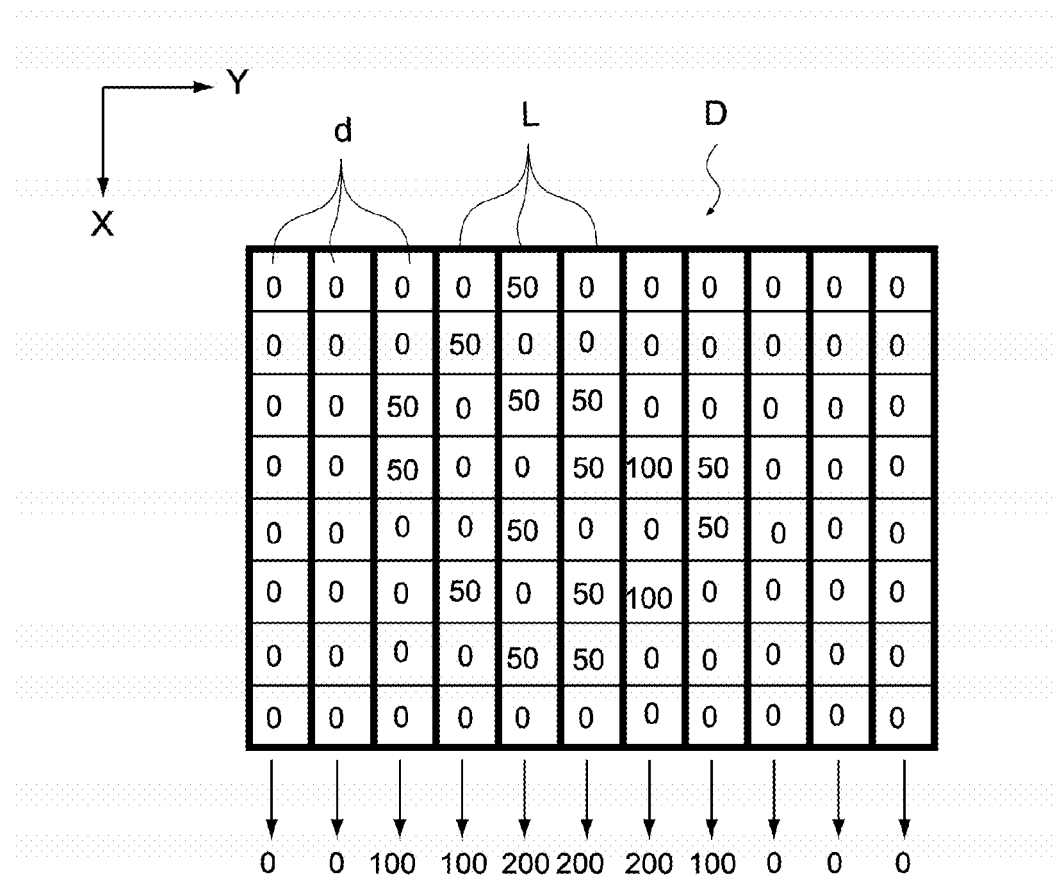
FIG. 9 A schematic diagram showing summations of luminances by a luminance summation unit of the image processing apparatus.

The luminance totalizing unit 124 totalizes the luminances of the pixels in the differential image, that is, the differences of the pixels g in the pickup image G (St105). FIG. 9 is a schematic diagram showing totals of the luminances. FIG. 9 shows a differential image D, pixels d and pixel columns L that constitute the differential image. In the pixels d, numerical values of the luminances of the pixels d are indicated. As shown in the figure, the pixel columns L are columns of the pixels d arranged in one direction (for example, X direction) in the differential image D. The luminance totalizing unit 124 totalizes the luminances of the pixels d included in the pixel columns L for each pixel column L, thereby generating a luminance total value for each pixel column L. The luminance totalizing unit 124 supplies the generated luminance total value for each pixel column L to the pixel column generation unit 125.

Figure 10:
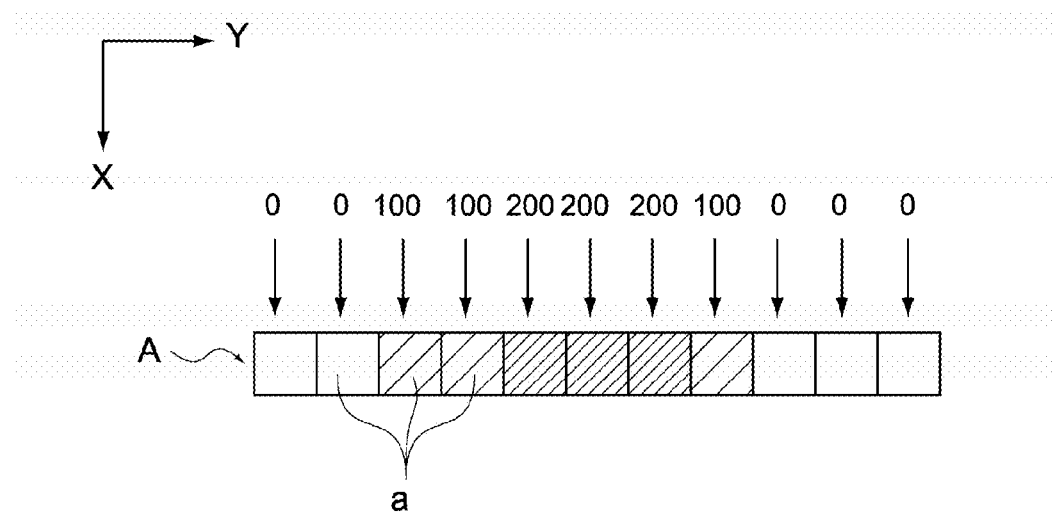
FIG. 10 A schematic diagram showing generation of an analysis pixel column by a pixel column generation unit of the image processing apparatus.

Then, on the basis of the luminance total value for each pixel column L, the pixel column generation unit 125 generates an analysis pixel column (St106). FIG. 10 is a schematic diagram showing the generation of the analysis pixel column. The pixel column generation unit 125 generates pixels a which are obtained by setting the luminance total values of the pixel columns L as the luminances and arranges the pixels a in order of the pixel columns L, thereby generating an analysis pixel column A. The arrangement direction of the analysis pixel column is set as a first direction (Y direction). The pixel column generation unit 125 generates, from each of the pickup images, one analysis pixel column, that is, the analysis pixel column corresponding to each pickup image. The pixel column generation unit 125 supplies the generated analysis pixel column to the image generation unit 126.

Figure 11:
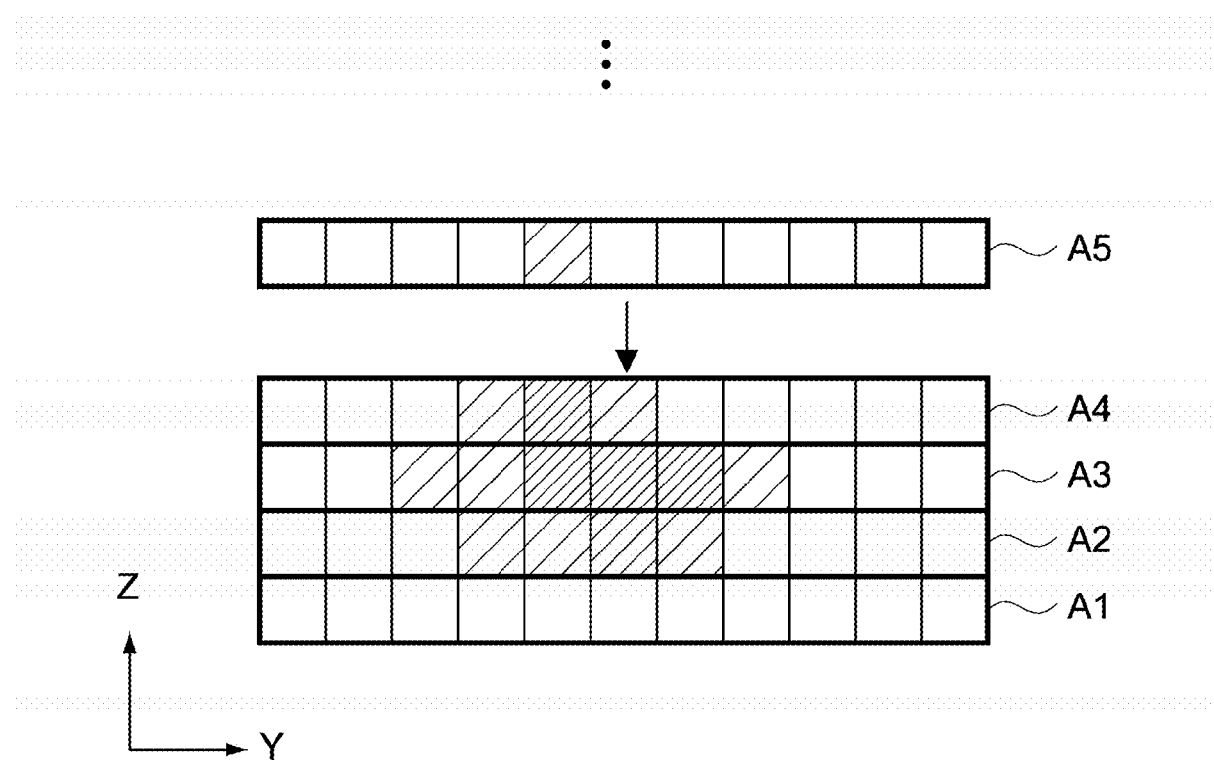
FIG. 11 A schematic diagram showing generation of an analysis image by an image generation unit of the image processing apparatus.

Subsequently, the image generation unit 126 arranges the analysis pixel columns to generate an analysis image (St107). FIG. 11 is a schematic diagram showing the generation of the analysis image. The image generation unit 126 arranges analysis pixel columns A (A1 to A5) in order of the focal depths of the pickup images from which the analysis pixel columns A are generated in a second direction perpendicular to the first direction (Y direction). FIG. 11 shows the analysis pixel columns corresponding to the pickup images taken at the focal depths (focal depths F1 to F5 shown in FIG. 3) as the analysis pixel columns A1 to A5. The analysis pixel columns are arranged in the order of the focal depths of the pickup images, so the second direction can be regarded as the depth direction of the focal depths (Z direction).

Figure 12:
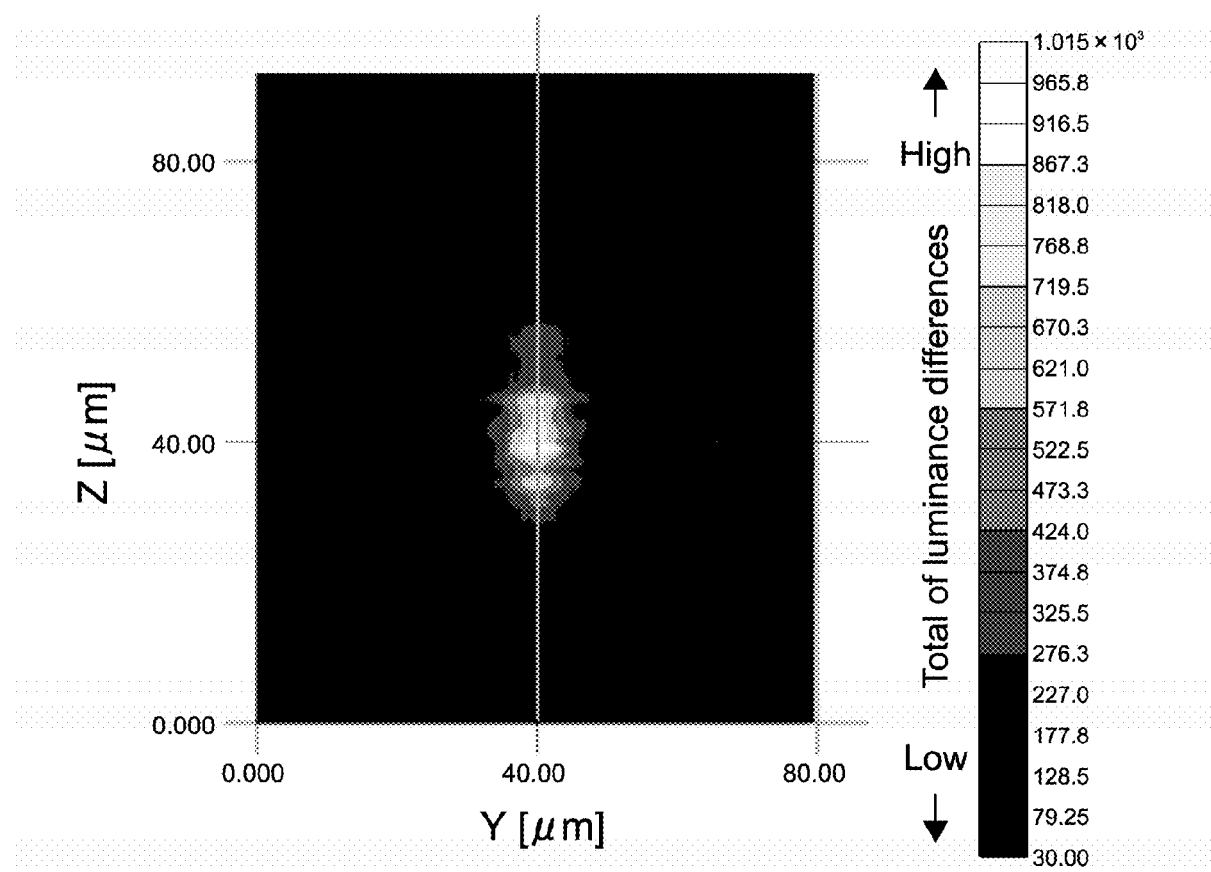
FIG. 12 A diagram showing an example of the analysis image generated by the image generation unit of the image processing apparatus.

FIG. 12 is a diagram showing an example of the analysis image. As shown in the figure, in the analysis image, it is possible to obtain information relating to a distribution of the differences (hereinafter, difference distribution) of the luminances about in one direction (Y direction in this case) in the pickup image and the focal depth direction (Z direction).

Figure 13:
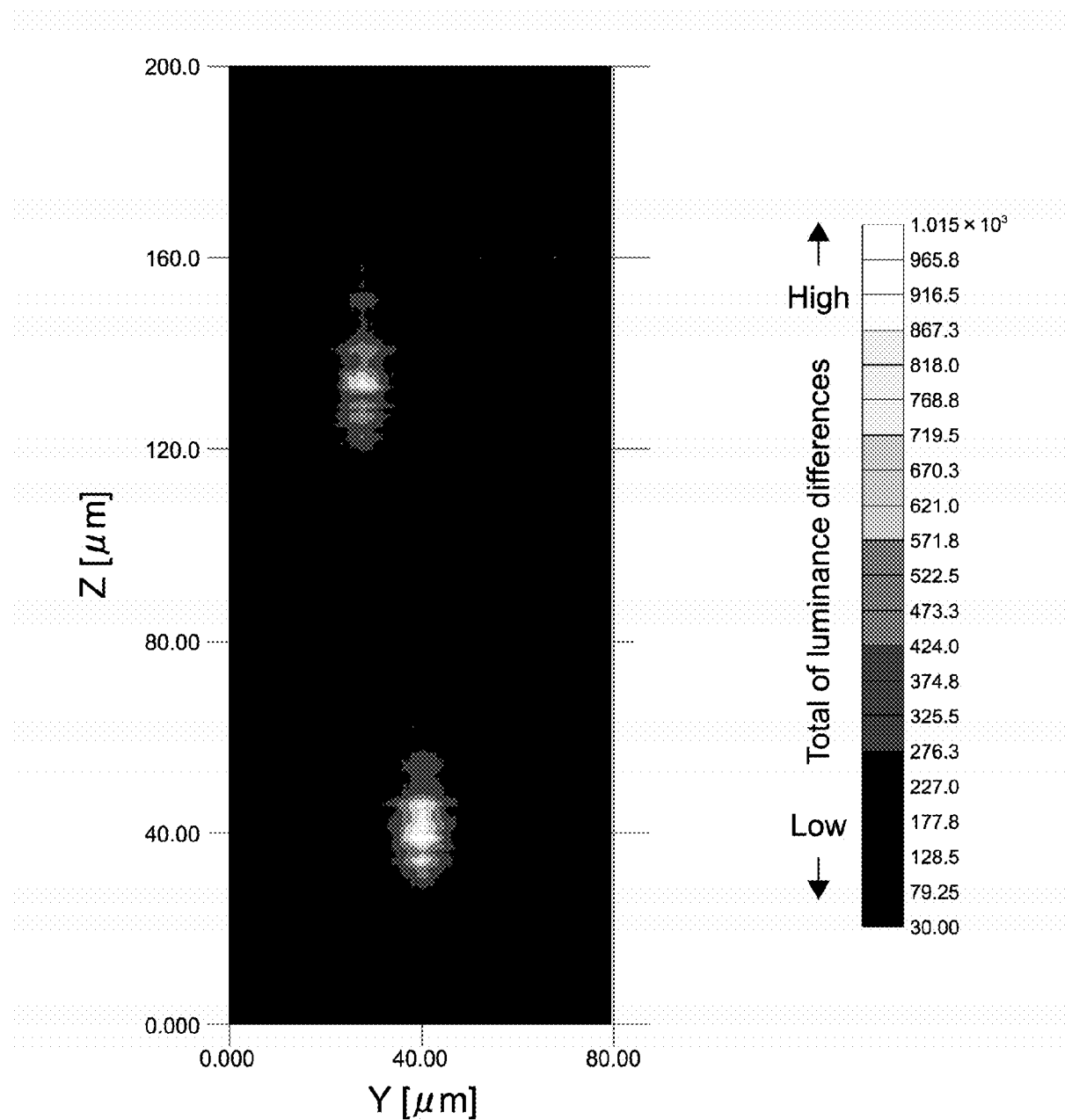
FIG. 13 A diagram showing an example of the analysis image generated by the image generation unit of the image processing apparatus.

The analysis image shown in FIG. 12 is generated from the pickup image group (for example, FIGS. 4(*a*) to (*e*)) in a range of the focal depth including one transparent bead. As shown in the figure, it is possible to confirm a peak that shows the transparent bead at a predetermined focal depth (40 μm). FIG. 13 shows the analysis image generated from the pickup image group (for example, FIG. 4(*a*) to (*i*)) in a range of the focal depth including two transparent beads included in the bead layer B1 and the bead layer B2 in the experiment system. In the figure, it is possible to confirm peaks that show the transparent beads included in the two focal depths (that is, bead layer B1 or B2).

Figure 14:
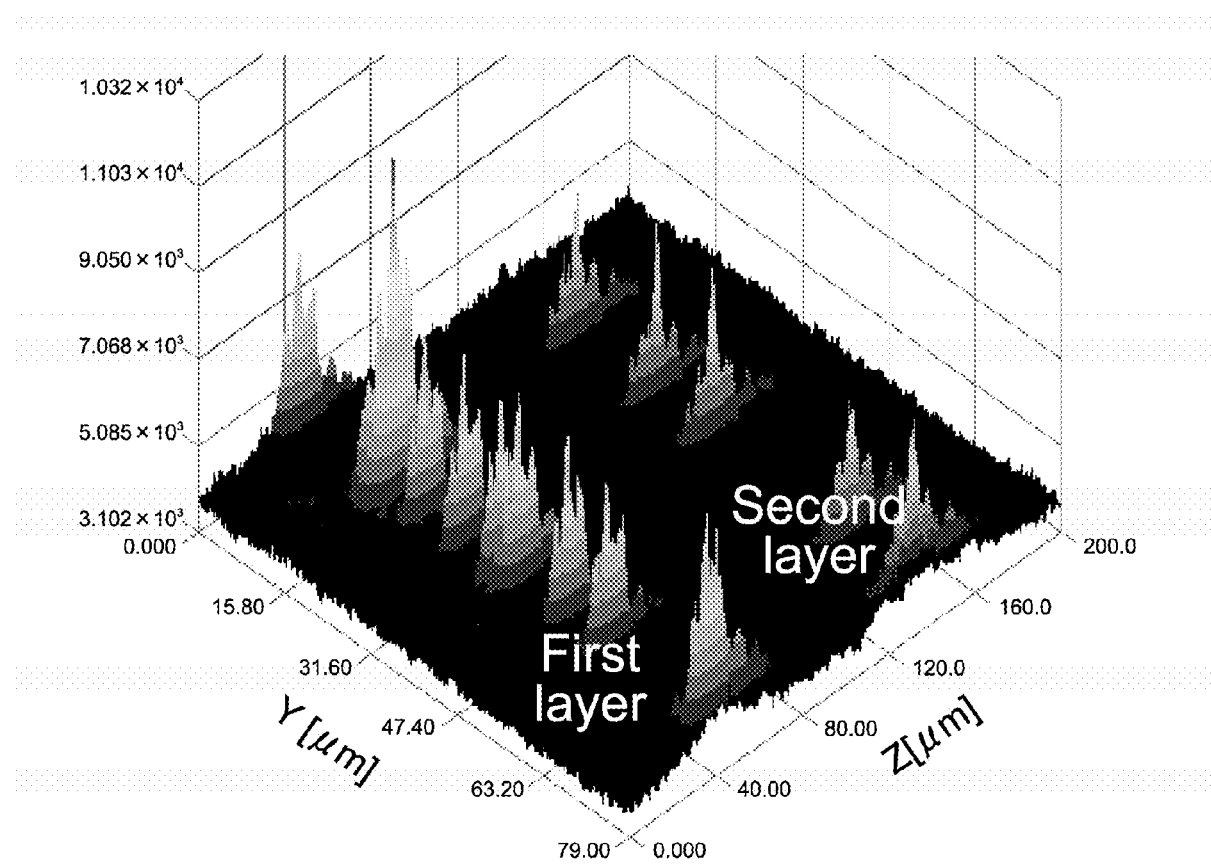
FIG. 14 A diagram showing an example of a graph in which the analysis image generated by the image generation unit of the image processing apparatus is expressed in a three-dimensional form.

FIG. 14 is a graph in which the analysis image generated from the pickup image group including a great number of beads included in the bead layer B1 and the bead layer B2 in the experiment system is expressed in a three-dimensional form on the basis of intensities of the differences. As shown in the figure, it is possible to confirm peaks that show the bead layer B1 and the bead layer B2. It should be noted that, in FIG. 12 to FIG. 14, the expansion in the Z direction differs depending on an NA (magnification) of an objective lens and thus can be presented after correction by the NA.

The image generation unit 126 is capable of supplying the generated analysis image to the analysis unit 127. In addition, the image generation unit 126 may present, to the observer, the generated analysis image by displaying the analysis image on a display or the like.

Figure 15:
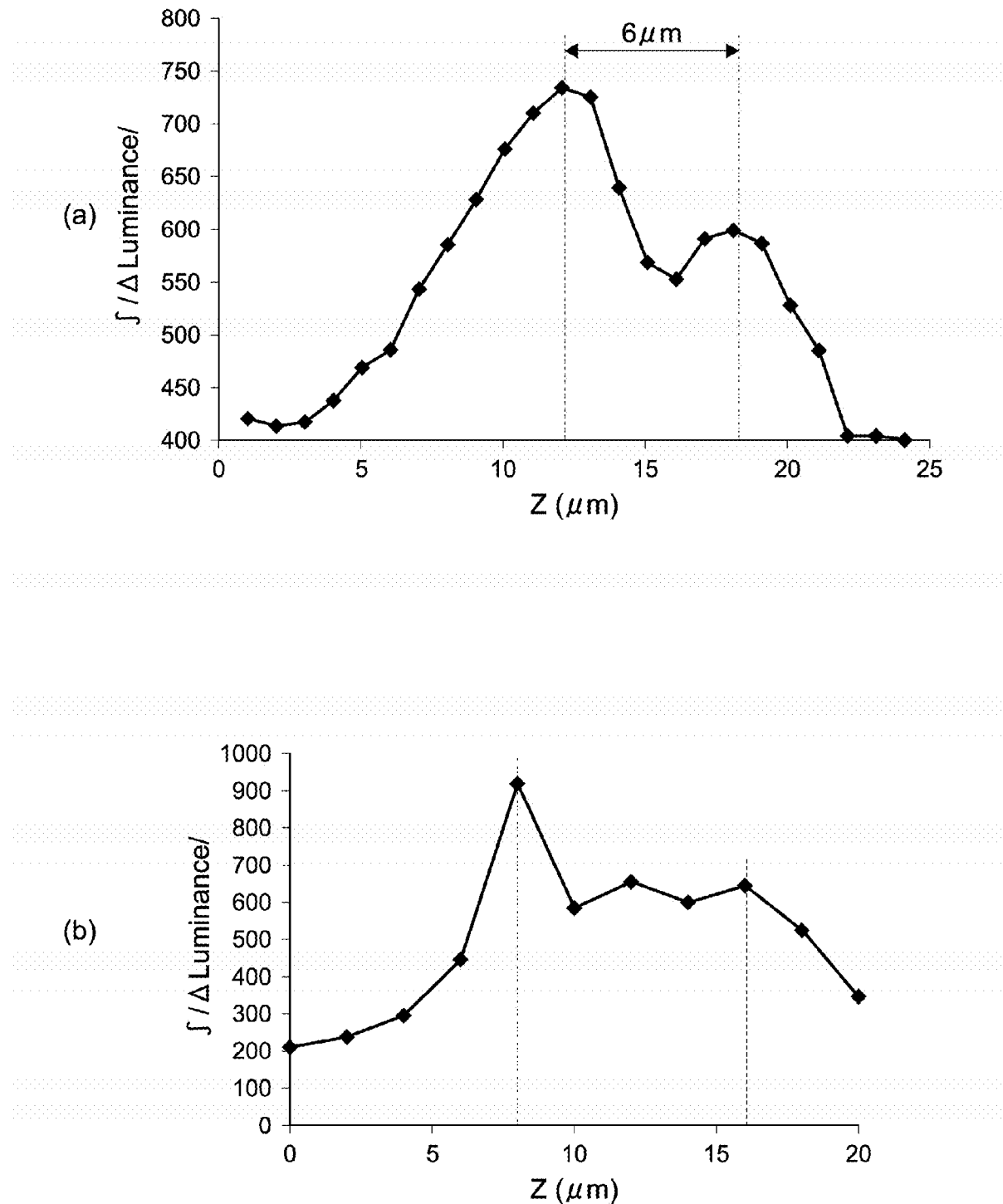
FIG. 15 A schematic diagram showing analyses by an analysis unit of the image processing apparatus.

Subsequently, the analysis unit 127 analyzes the analysis image and obtains the three-dimensional information of the observation target object P (size and spatial position of the observation target object P) (St108). FIG. 15 is a schematic diagram showing analyses by the analysis unit 127. FIG. 15(*a*) is a graph that shows the differences of the luminances on a center line of the analysis image shown in FIG. 12, and as described above, the observation target object is a transparent bead having a diameter of 6 μm. Further, FIG. 15(*b*) is a graph generated from the analysis image in the case where a hematopoietic stem cell is the observation target object. FIG. 15 is the example in the case of a phase difference observation with an objective lens of 60× magnification, and the calculation method may be different depending on conditions (case where double peaks do not occur can be caused). However, such a peculiar pattern is detected in accordance with conditions, thereby making it possible to detect a size of a transparent object.

As described above, in the analysis image, the differences of the luminances of the pixels in the pickup image are indicated as the luminances, so in each of the graphs, two peaks indicated by broken lines indicate the periphery (outline) of the observation target objects. Thus, for example, in the graph shown in FIG. 15(*a*), the interval between the two peaks is approximately 6 µm. That is, it can be determined that the two peaks are formed by the transparent beads (diameter of 6 µm).

As described above, the analysis unit 127 obtains, from the analysis image, the three-dimensional information of the observation target object P (size, spatial position, and the like). The analysis unit 127 can exclude an object from the observation target depending on the size of the observation target object P, for example, or can detect the amount of movement of the observation target object P. The analysis unit 127 may cause the analysis result to be displayed on a display or the like to present the result to the observer, and may supply the three-dimensional information of the observation target object P determined to be observed to the image pickup control unit 128.

The image pickup control unit 128 uses the three-dimensional information supplied from the analysis unit 127, with the result that the focal depth, the range of field of view, and the like of the image pickup control unit 128 can be controlled to cause the image pickup unit 110 to take an image of the observation target object P suitable for the observation.

As described above, the image processing apparatus 100 can obtain the three-dimensional information of the observation target object P by image processing for the plurality of pickup images whose focal depths at which the images are taken by the image pickup unit 110 are different. For the image pickup unit 110, a general optical microscope can be used. That is, a special microscope such as a laser scanning microscope does not have to be used therefor. In addition, the pickup images may be taken at predetermined focal depth intervals, and it takes a very short time to take the images. In addition, no damage is caused due to laser irradiation with respect to the observation target object, and the movement of the observation target object (migration of cells, for example) can be detected, so the image processing apparatus 100 is suitable for an observation of a living cell or the like.

Figure 16:
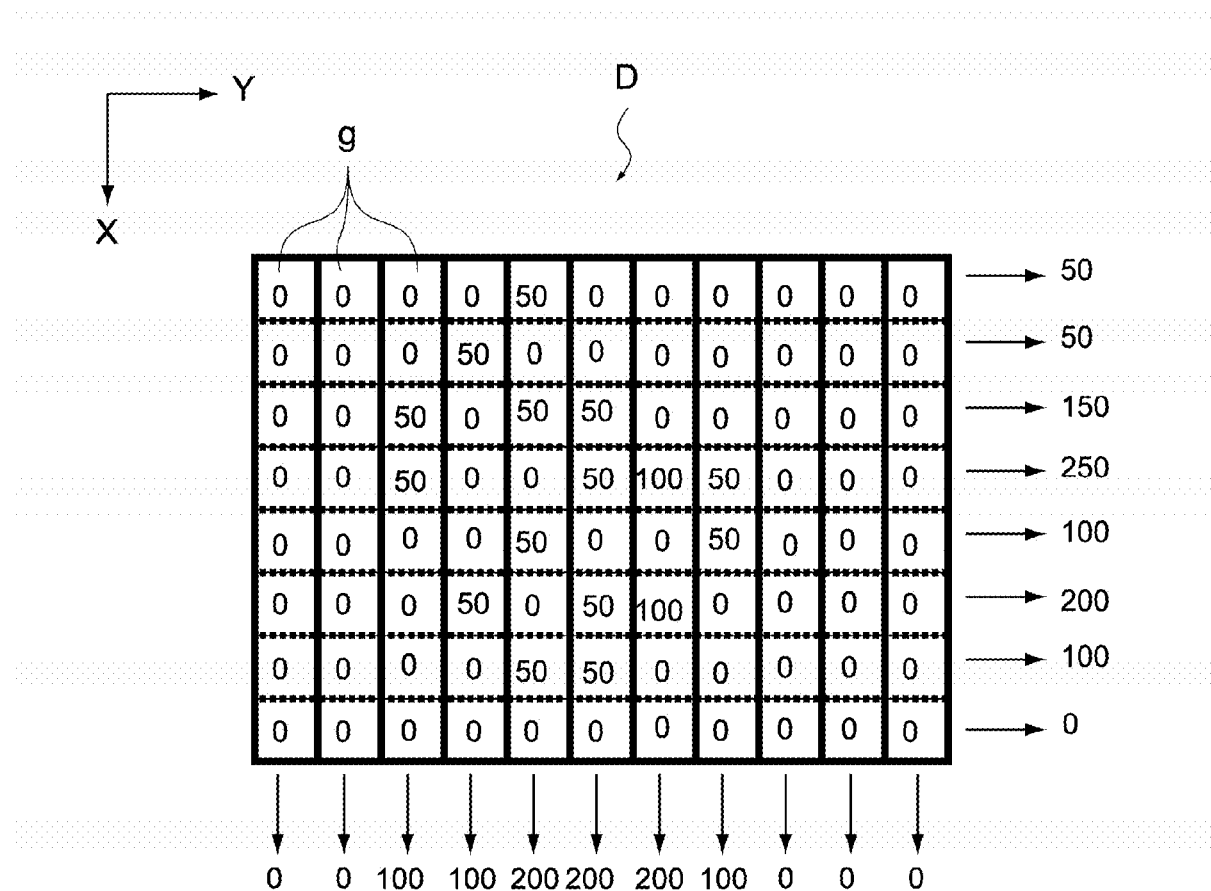
FIG. 16 A schematic diagram showing summations of luminances by the luminance summation unit of the image processing apparatus.
Figure 17:
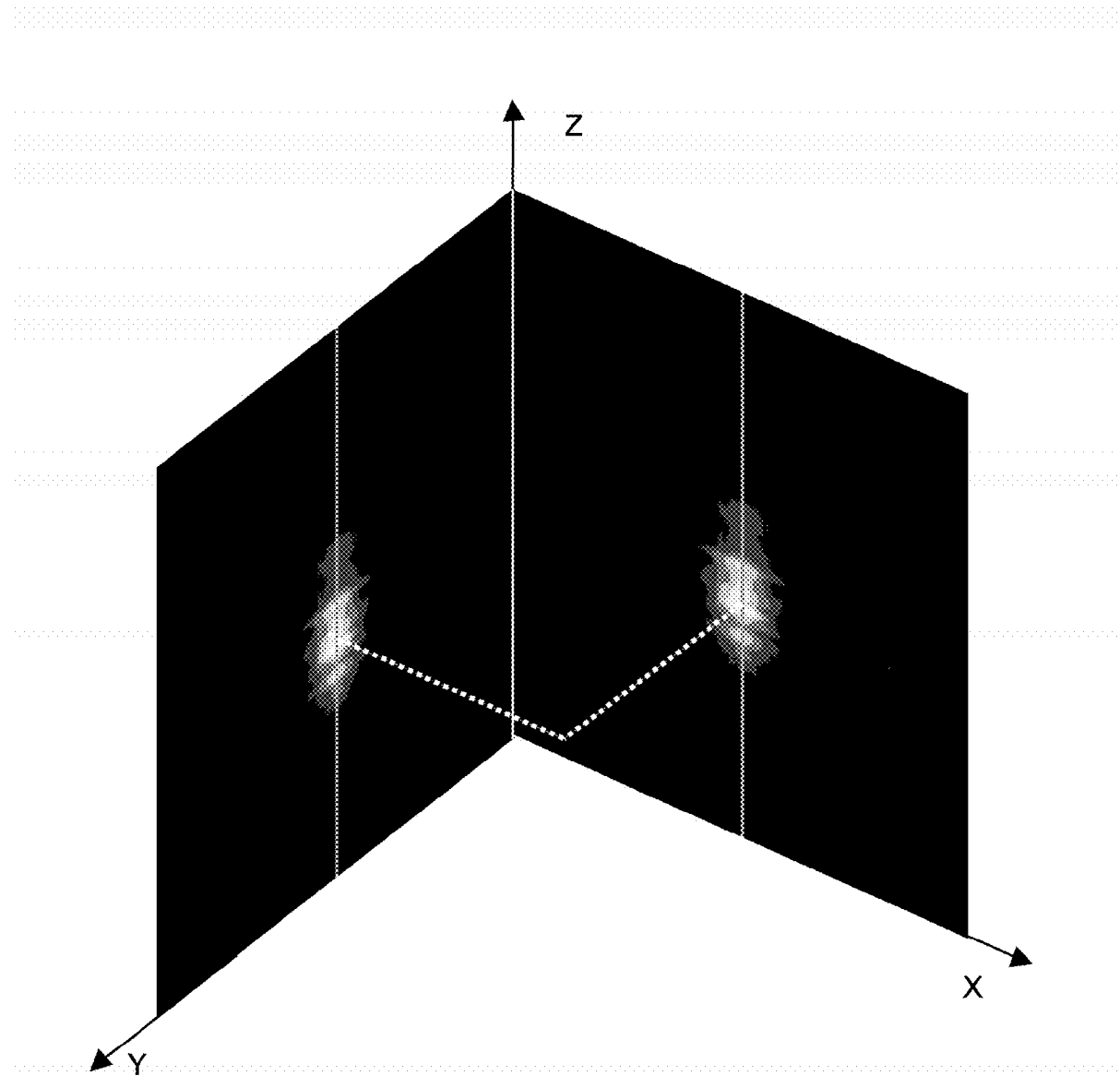
FIG. 17 A diagram showing an example of an analysis image generated by the image generation unit of the image processing apparatus.

As shown in FIG. 9, in this embodiment, the luminance totalizing unit 124 totalizes the luminances of the pixels for the pixel column in one direction (X direction) of the differential image. Here, the luminance totalizing unit 124 may totalize the luminances of the pixels in two directions (X direction and Y direction) of the differential image. FIG. 16 is a schematic diagram showing totals in two directions. The pixel column generation unit 125 can generate the analysis pixel columns from each of the luminance total values calculated in the two directions, and the image generation unit 126 can generate the analysis image from the analysis pixel columns. FIG. 17 is a schematic diagram showing two analysis images generated by the image generation unit 126. As shown in the figure, from the analysis image on a Y-Z plane and the analysis image on an X-Z plane, it is possible to specify a spatial position of a peak of a difference distribution (X, Y, and Z coordinates).

Second Embodiment

Figure 18:
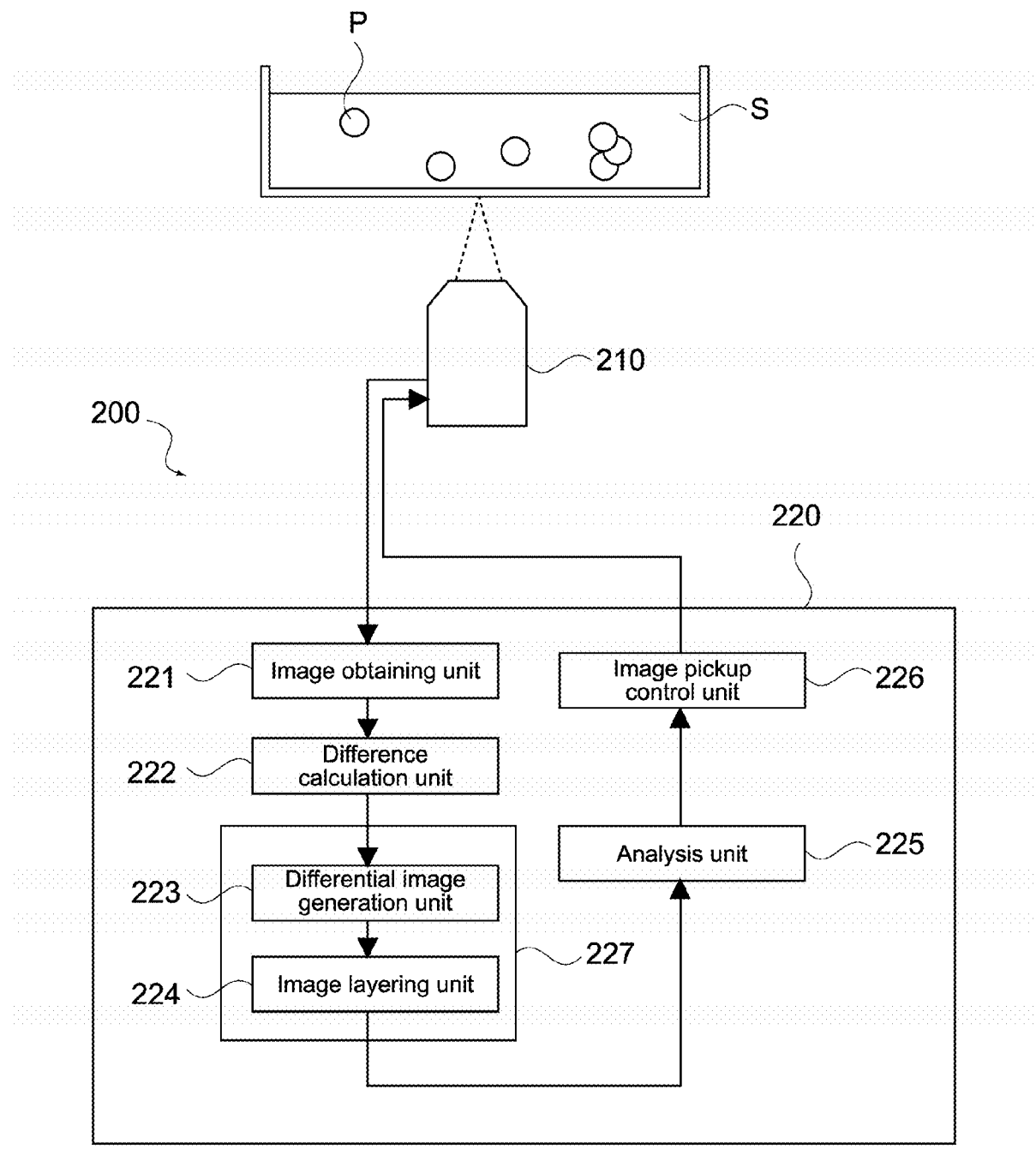
FIG. 18 A schematic diagram showing the structure of an image processing apparatus according to a second embodiment of the present disclosure.

An image processing apparatus according to a second embodiment of the present technology will be described. FIG. 18 is a schematic diagram showing the structure of an image processing apparatus 200 according to this embodiment.

[Structure of Image Processing Apparatus]

As shown in the figure, the image processing apparatus 200 includes an image pickup unit 210 and an image processing unit 220. The image pickup unit 210 is various optimal microscopes such as a bright field microscope and a phase difference microscope, and the image processing unit 120 can be an information processing apparatus such as a personal computer. It should be noted that the image processing unit 220 may be formed integrally with the image pickup unit 210.

The structure of the image pickup unit 210 is the same as the image pickup unit 210 according to the first embodiment, so a description thereof will be omitted. The image processing unit 220 includes an image obtaining unit 221, a difference calculation unit 222, a differential image generation unit 223, an image layering unit 224, an analysis unit 225, and an image pickup control unit 226. The differential image generation unit 223 and the image layering unit 224 constitute a difference distribution generation unit 227. Those components can be functional structures achieved by hardware and software in cooperation with each other. It should be noted that the outline of the components of the image processing unit 220 will be described here, and details thereof will be described with an explanation of an operation of the image processing apparatus 200.

As in the first embodiment, the image obtaining unit 221 obtains a pickup image group taken at a different focal depth from the image pickup unit 210. At this time, the image obtaining unit 221 obtains the focal depth at which each of the pickup images are taken with the pickup image. The image obtaining unit 221 supplies the pickup image group and the focal depth at which each of the pickup images are taken to the difference calculation unit 222.

In the pickup images, the difference calculation unit 222 calculates differences of luminances from a pixel adjacent thereto for each of the pixels that constitute the pickup image. The difference calculation unit 222 calculates the differences of pixels for all the pickup images included in the pickup image group. The difference calculation unit 222 supplies the calculated differences of the pixels and position coordinates of the pixels in the pickup image to the differential image generation unit 223.

On the basis of the differences calculated by the difference calculation unit 222 and the focal depths at which the pickup images including the pixels whose differences are calculated are taken, the difference distribution generation unit 227 generates a distribution of the differences with respect to the focal depths. Specifically, the difference distribution generation unit 227 can have the following structure.

The differential image generation unit 223 generates a differential image obtained by replacing the luminances of the pixels that constitute the pickup images by the differences calculated by the difference calculation unit 222. The differential image generation unit 223 generates the differential images for all the pickup images included in the pickup image group. The differential image generation unit 223 supplies the generated differential images to the image layering unit 224.

For the differential images generated by the differential image generation unit 223, the image layering unit 224 generates data (hereinafter, layered data) obtained by virtually layering the differential images in order of corresponding focal depths at which the pickup images are taken. The image layering unit 224 supplies the layered data to the analysis unit 225.

As described above, the difference distribution generation unit 227 includes the differential image generation unit 223 and the image layering unit 224 and generates the distribution of the differences with respect to the focal depths as the layered data. However, the difference distribution generation unit 227 may not necessarily have these structures, as long as the difference distribution generation unit 227 can generate the distribution of the differences with respect to the focal depths of the pickup images.

On the basis of the distribution of the differences with respect to the focal depths (layered data in this embodiment), the analysis unit 225 obtains the three-dimensional information of the observation target object P (size, spatial position, and the like). As in the first embodiment, the analysis unit 225 excludes an object from the observation target depending on the size of the observation target object P or can detect the amount of movement of the observation target object P. The analysis unit 225 can supply the three-dimensional information of the observation target object P which is determined to be observed to the image pickup control unit 226.

On the basis of the three-dimensional information supplied from the analysis unit 225, the image pickup control unit 226 controls the image pickup unit 210 to take an image for an observation. The image pickup control unit 226 uses the three-dimensional information supplied from the analysis unit 225, with the result that the focal depth, the range of field of view, or the like of the image pickup unit 210 can be controlled, and the image of the observation target object P which is suitable for the observation can be taken.

[Operation of Image Processing Apparatus]

Figure 19:
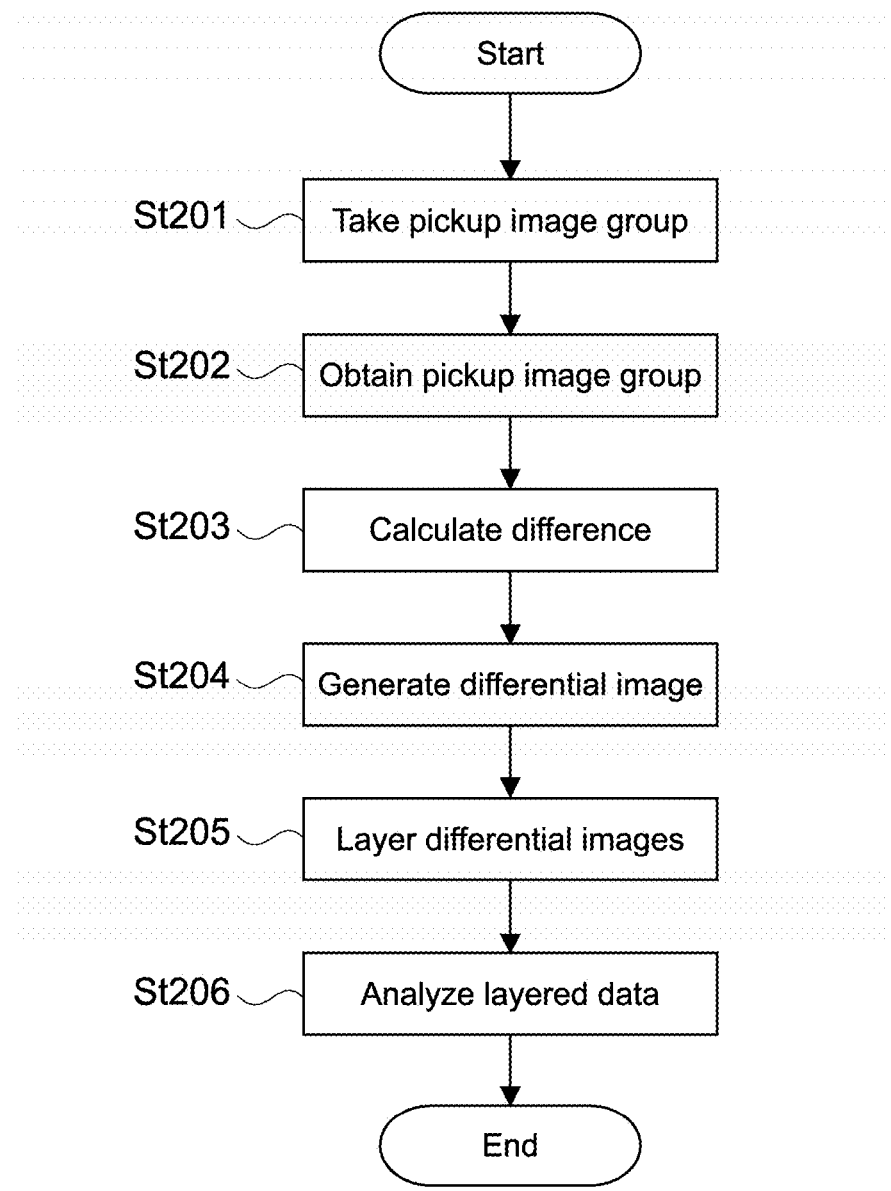
FIG. 19 A flowchart showing an operation of the image processing apparatus.

An operation of the image processing apparatus 200 will be described. FIG. 19 is a flowchart for showing the operation of the image processing apparatus 200.

As in the first embodiment, by the image pickup control unit 226, the image pickup unit 210 is controlled, thereby taking a plurality of pickup images (pickup image group) (St201). It should be noted that the pickup image group may be taken by an observer.

Figure 20:
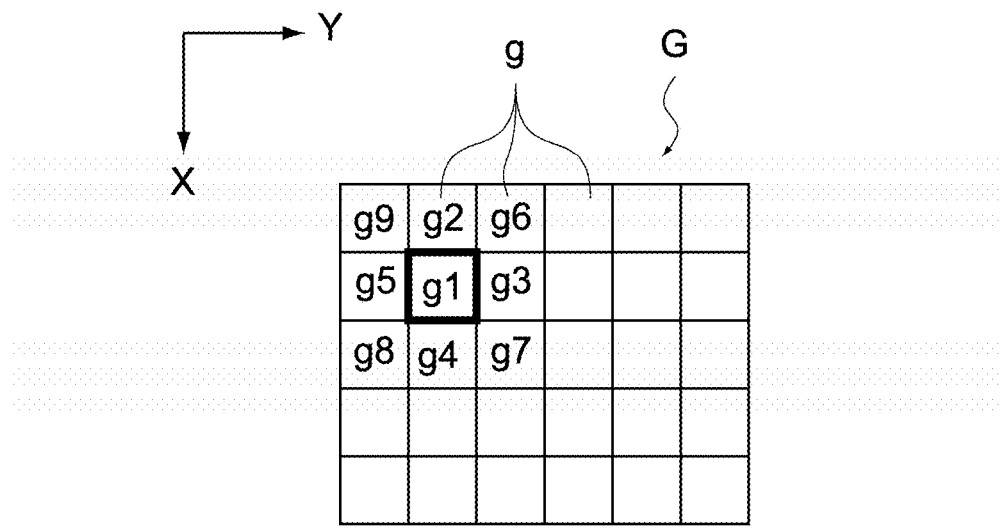
FIG. 20 A schematic diagram showing calculation of differences by a difference calculation unit of the image processing apparatus.

Subsequently, the image obtaining unit 221 obtains the pickup image group from the image pickup unit 210 (St202). In addition, the difference calculation unit 222 calculates, for each of the pickup image, the differences of the luminances of the pixels that constitute the pickup image (St203). FIG. 20 is a schematic diagram showing the calculation of the differences by the difference calculation unit 222.

As shown in the figure, for the pixels g of the pickup image G, the difference calculation unit 222 can calculate differences of luminances from pixels adjacent to the pixels g. For example, for the pixel g1, the difference calculation unit 222 can calculate the differences of the luminances from all adjacent pixels (pixel g2 to pixel g9) disposed around the pixel g1. Further, for the pixel g1, the difference calculation unit 222 can calculate the differences of the luminances from pixels adjacent thereto in the X direction and the Y direction (pixels g1 to g4). The difference calculation unit 222 can set the sum of the calculated differences from the pixels for the pixel g1 to be a difference relating to the pixel g1. In this way, the difference calculation unit 122 calculates the differences of the luminances for the other pixels g included in the pickup image G.

Subsequently, the differential image generation unit 223 replaces the luminances of the pixels g in the pickup image G by the differences calculated for the pixels g, thereby generating the differential image (St204). As in the first embodiment, the differential image generation unit 223 can generate the differential image. The differential image generation unit 223 supplies the generated differential image to the image layering unit 224.

Figure 21:
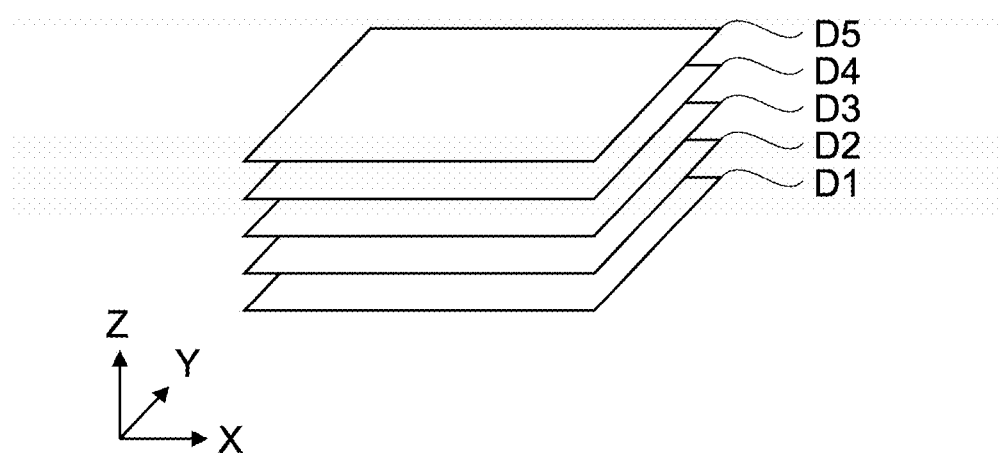
FIG. 21 A schematic diagram showing lamination of differential images by an image lamination unit of the image processing apparatus.
Figure 22:
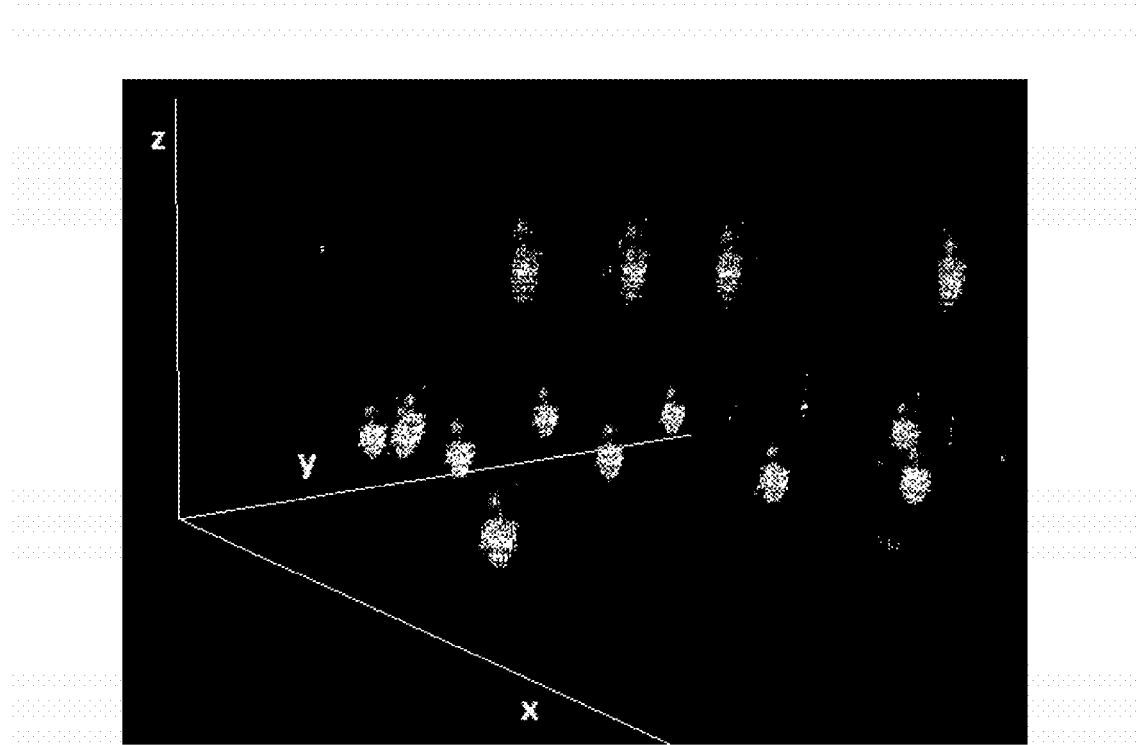
FIG. 22 A diagram showing an example of lamination data generated by the image lamination unit of the image processing apparatus.

Subsequently, the image layering unit 224 layers the differential images (St205). FIG. 21 is a schematic diagram showing layers of the differential images layered by the image layering unit 224. In the figure, the differential images corresponding to the pickup images taken at the focal depths (focal depths F1 to F5 shown in FIG. 3) are indicated as differential images D1 to D5. As shown in the figure, the image layering unit 224 virtually layers the differential image in order of the focal depths at which the pickup images are taken (order of F1 to F5) to which the differential images are respectively corresponded with positions of the images (X position and Y position) aligned. Data generated by the layering is regarded as layered data. FIG. 22 shows an example of the layered data. In FIG. 22, out of the pixels of the layered differential images, only pixels having larger luminances (differences between the pixels in the pickup image) are shown.

The image layering unit 224 can supply the generated layered data to the analysis unit 225. Further, the image layering unit 224 may present, to the observer, the generated layered data by displaying the data on a display or the like. It should be noted that, in FIG. 22, expansion in the Z direction differs depending on an NA (magnification) of the objective lens and therefore can be presented after being corrected by the NA.

Then, the analysis unit 225 analyzes the layered data and obtains three-dimensional information of the observation target object P (size and spatial position of the observation target object P) (St206). As in the first embodiment, the analysis unit 225 can obtain the three-dimensional information of the observation target object P. For example, the analysis unit 225 can exclude an object from the observation target depending on the size of the observation target object P or can detect the amount of movement of the observation target object P. The analysis unit 225 may present, to the observer, an analysis result by displaying the result on the display or the like and may supply the three-dimensional information of the observation target object P which is determined to be observed to the image pickup control unit 226.

The image pickup control unit 226 uses the three-dimensional information supplied from the analysis unit 225, with the result that the focal depth, the range of field of view, or the like of the image pickup unit 210 can be controlled to cause the image pickup unit 210 to take an image of the observation target object P suitable for the observation.

As described above, image processing apparatus 200, by the image processing with respect to the plurality of pickup images with different focal depths taken by the image pickup unit 210, it is possible to obtain the three-dimensional information of the observation target object P. For the image pickup unit 210, a general optical microscope can be used. That is, a special microscope such as a laser scanning microscope does not have to be used therefor. In addition, the pickup images may be taken at predetermined focal depth intervals, and it takes a very short time to take the images. In addition, no damage is caused due to laser irradiation with respect to the observation target object, and the movement of the observation target object (migration of cells, for example) can be detected, so the image processing apparatus is suitable for an observation of a living cell or the like.

Figure 23:
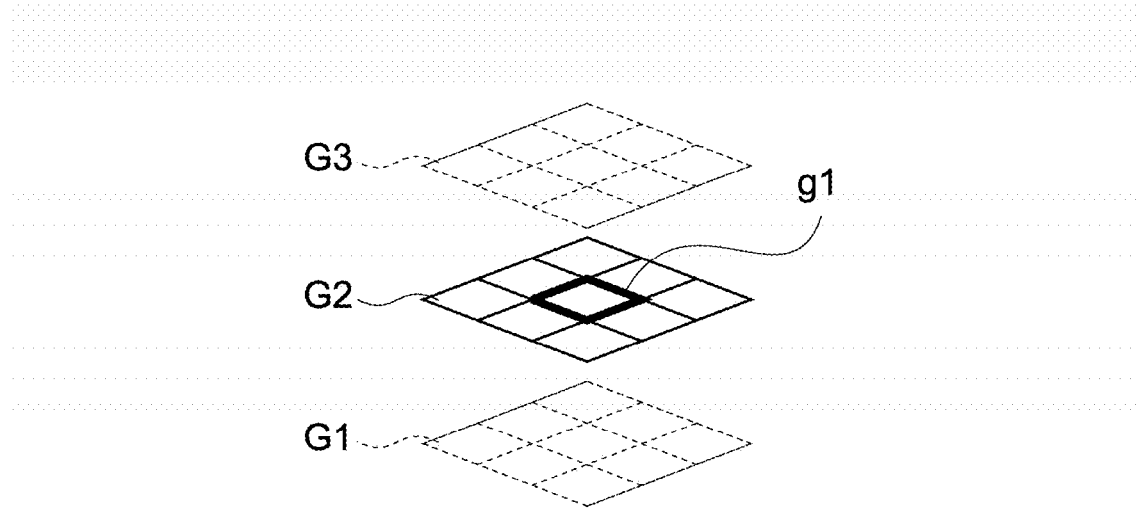
FIG. 23 A schematic diagram showing calculation of a difference by the difference calculation unit of the image processing apparatus.

In this embodiment, as shown in FIG. 18, the difference calculation unit 222 calculates the difference from the pixels (g2 to g9) adjacent to one pixel (g1) in the pickup image. Here, the difference calculation unit 222 can calculate a difference between pixels included in another pickup image taken at a different focal depth. FIG. 23 shows a state in which pickup images G1, G2, and G3 are layered in order of the focal depths at which the images are taken. For example, the difference calculation unit 222 can calculate, for the pixel g1 of the pickup image G2, not only differences from pixels adjacent to the pixel g1 included in the pickup image G2 but also differences from pixels adjacent to the pixel g1 which are included in the pickup image G1 and the pickup image G2, and set a sum thereof as a difference related to the pixel g1.

The present technology is not limited to the above embodiments and can be changed without departing from the gist of the present technology.

[About Adjustment of Image Pickup Timing]

In the above embodiments, the image pickup unit takes images of observation sample at different focal depths. Here, in the case where the observation target object included in the observation sample is a pulsating cell (cell that repeatedly contract and relax) such as a myocardial cell, it is desirable to adjust image pickup timing of the image pickup unit.

That is, in the case where different phases of pulsations are caused between the pickup images taken at different focal depths, for example, in the case where a pulsating cell an image of which is taken at a focal depth contracts, and a pulsating cell an image of which is taken at the next focal depth relaxes, there is a fear that the three-dimensional information obtained as described above may be affected. Therefore, in this case, at focal depths, by taking pickup images at timing when the phases of the pulsations coincide, it is possible to prevent the three-dimensional information from being affected by the pulsations.

It is possible to obtain the phases of the pulsating cell at the focal depths by a motion estimation method. As the motion estimation method, a block matching method, a gradient method, or the like can be used. Specifically, frame images of a moving image taken for a predetermined time period at focal depths are used. Each of the frame images is divided into pixel groups (blocks), and a motion vector (optical flow) between each block and corresponding blocks in preceding and subsequent frame images is detected. As a result, the phases of the pulsations at the focal depths can be detected. By using this, the image pickup timing at the focal depths is adjusted, with the result that it is possible to cause the phases of the pulsations even at different focal depths to coincide with each other.

Figure 24:
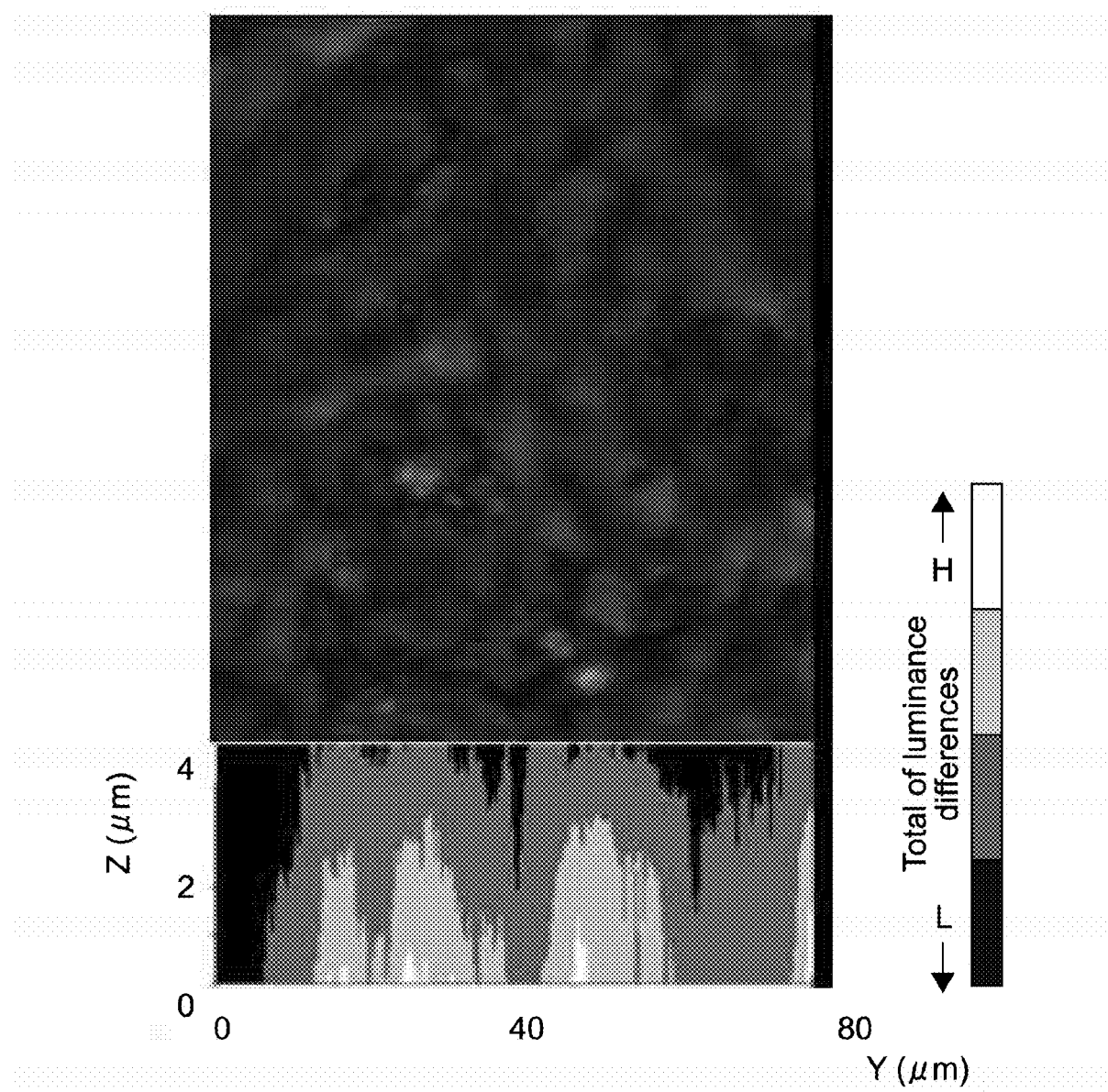
FIG. 24 A diagram showing an example of a pickup image and a generated analysis image of a pulsating cell by the image processing apparatus.
Figure 25:
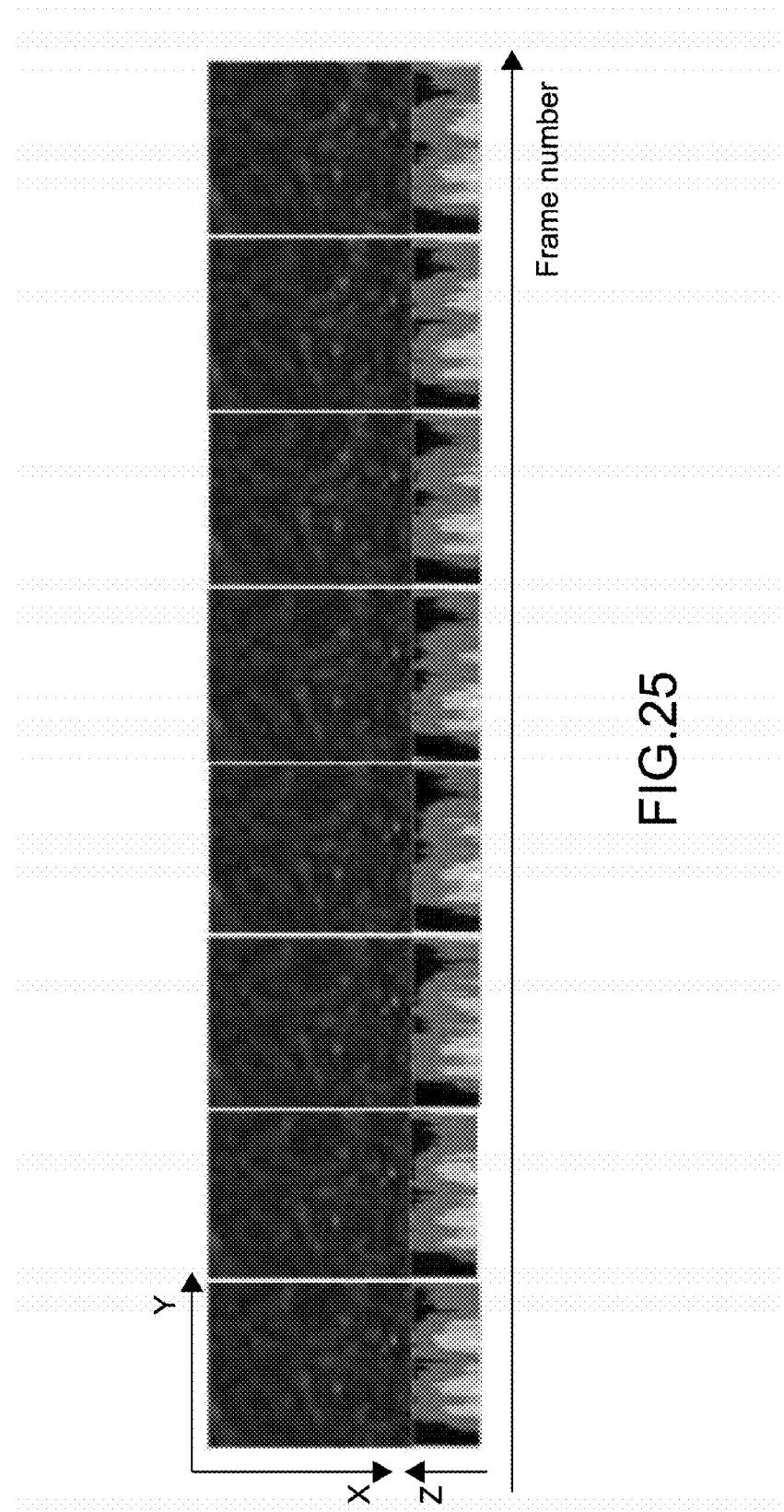
FIG. 25 A diagram showing an analysis image generated by a pickup image (image frames of a moving image) of the pulsating cell by the same diagram processing apparatus.

FIG. 24 shows a trimming image (upper side) of a pulsating cell (myocardial cell derived from iPS) and an analysis image (lower side) generated by applying the present technology. In FIG. 24, the center of the myocardial cell exists slightly on a right side from the center of the image in the Y direction and in the vicinity of the center in the X direction. FIG. 25 shows frame images (upper side) of a moving image of the pulsating cell for one second and analysis images (lower side) thereof from left to right in order, and the change of pulsations in contraction and relaxation is shown. In FIG. 25, when an attention is focused on a result in the vicinity of the center of the cell, the analysis images is changed in association with the change in the number of frames, and it is found that a thickness (Z direction) is increased by approximately 1.5 μm in a contraction period and returned in a relaxation period. It is thought that the phenomenon that the thickness of the cell is increased (elevated) in the vicinity of the center of the cell in the contraction period is appropriate. By applying the present technology, a possibility that such a spatial change is analyzed is shown.

It should be noted that the present technology can take the following configuration.

(1) An image processing apparatus, including:

a difference calculation unit to calculate, for each of pixels that constitute a pickup image in each of a plurality of pickup images taken at different focal depths, a difference of a luminance value from an adjacent pixel; and a difference distribution generation unit to generate, on the basis of the difference and the focal depth at which the pickup image including the pixel whose difference is calculated is taken, a distribution of the difference with respect to the focal depth.

(2) The image processing apparatus according to (1) above, in which the difference distribution generation unit includes a differential image generation unit to generate, for each of the plurality of pickup images, a differential image obtained by replacing a luminance of the pixel that constitute the pickup image by the difference to generate a plurality of differential images corresponding to the plurality of pickup images, respectively, a luminance totalizing unit to totalize, in each of the plurality of differential images, the luminances of the pixels for each of pixel columns that constitute the differential image to generate a luminance total value for each pixel column, a pixel column generation unit to arrange, for each of the plurality of differential images, the pixels having the luminance total value as the luminance in a first direction in order of the pixel columns to generate a plurality of analysis pixel columns corresponding to the plurality of differential images, respectively, and an image generation unit to arrange the plurality of analysis pixel columns in a second direction perpendicular to the first direction in order of the focal depths at which the plurality of pickup images respectively corresponding to the analysis pixel columns are taken, to generate an analysis image.

(3) The image processing apparatus according to (1) or (2) above, in which the difference distribution generation unit generates, for each of the plurality of pickup images, a differential image obtained by replacing a luminance of the pixel that constitute the pickup image by the difference to generate a plurality of differential images respectively corresponding to the plurality of pickup images, and an image layering unit to layer the plurality of differential images in order of the focal depths at which the plurality of pickup images respectively corresponding to the plurality of differential images are taken.

(4) The image processing apparatus according to any one of (1) to (3) above, further including an analysis unit to obtain three-dimensional information of an observation target object in a range of the focal depths at which the plurality of pickup images are taken, on the basis of the distribution of the differences generated by the difference distribution generation unit.

(5) The image processing apparatus according to any one of (1) to (3) above, further including an image pickup control unit to control an image pickup unit that takes an image of the observation target object, on the basis of the three-dimensional information obtained by the analysis unit.

(6) The image processing apparatus according to any one of (1) to (5) above, in which the image pickup unit takes the plurality of pickup images through an optical microscope.

(7) An image processing program causing a computer to function as a difference calculation unit to calculate, for each of pixels that constitute a pickup image in each of a plurality of pickup images taken at different focal depths, a difference of a luminance value from an adjacent pixel, and a difference distribution generation unit to generate, on the basis of the difference and the focal depth at which the pickup image including the pixel whose difference is calculated is taken, a distribution of the difference with respect to the focal depth.

(8) An image processing method, including:

calculating, for each of pixels that constitute a pickup image in each of a plurality of pickup images taken at different focal depths, a difference of a luminance value from an adjacent pixel, by a difference calculation unit; and generating, on the basis of the difference and the focal depth at which the pickup image including the pixel whose difference is calculated is taken, a distribution of the difference with respect to the focal depth, by a difference distribution generation unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF REFERENCE NUMERALS 100, 200: image processing apparatus
110, 210: image pickup unit
121, 221: image obtaining unit
122, 222: difference calculation unit
123, 223: differential image generation unit
124: luminance totalizing unit
125: pixel column generation unit
126: image generation unit
127, 225: analysis unit
128, 226: image pickup control unit
129: difference distribution generation unit
224: image layering unit
227: difference distribution generation unit

The invention claimed is:

1. An image processing apparatus, comprising:
an image pickup unit configured to pick up a plurality of images of an observation sample at different focal depths;
a difference calculation processor configured to calculate differences of luminance values of pixels in the images at different focal depths; and
a difference distribution generation processor configured to generate a distribution of the differences of the luminance values with respect to the different focal depths, wherein the difference distribution generation processor is configured to calculate luminance total values by totaling the differences of the luminance values for each pixel column in a first direction of the images, to arrange the luminance total values of each pixel column in a second direction perpendicular to the first direction at the different focal depths to form a plurality of analysis pixel columns, and to generate an analysis image based on the plurality of the analysis pixel columns in a diagram having a focal depth axis indicating a focal depth of the images and a positional information axis indicating a position in the second direction, and wherein the analysis image has a color representing the luminance total values, and
an analysis processor configured to calculate a size of the observation sample based on the analysis image.

2. The image processing apparatus according to claim 1, wherein the difference distribution generation processor is configured to generate, for each of the plurality of images, a differential image obtained by replacing a luminance of the pixel that constitutes the image by the difference to generate a plurality of differential images respectively corresponding to the plurality of images, and wherein an image layering processor is configured to layer the plurality of differential images in an order of the focal depths at which the plurality of images respectively corresponding to the plurality of differential images are taken.

3. The image processing apparatus according to claim 1, wherein the analysis processor is configured to obtain spatial position information of an observation target object in a range of the focal depths at which the plurality of pickup images are taken, on the basis of the distribution of the differences generated by the difference distribution generation processor.

4. The image processing apparatus according to claim 3, further comprising an image pickup control processor configured to control the image pickup unit on the basis of the three-dimensional information obtained by the analysis processor.

5. The image processing apparatus according to claim 4, wherein the image pickup unit includes an optical microscope.

6. A non-transitory computer readable storage medium storing an image processing program causing a computer to function as:
a difference calculation processor configured to calculate differences of luminance values of pixels in images of an observation sample at different focal depths; and
a difference distribution generation processor configured to generate a distribution of the differences of the luminance values with respect to the different focal depths, wherein the difference distribution generation processor is configured to calculate luminance total values by totaling the differences of the luminance values for each pixel column in a first direction of the images, to arrange the luminance total values of each pixel column in a second direction perpendicular to the first direction at the different focal depths to form a plurality of analysis pixel columns, and to generate an analysis image based on the plurality of the analysis pixel columns in a diagram having a focal depth axis indicating a focal depth of the images and a positional information axis indicating a position in the second direction, and wherein the analysis image has a color representing the luminance total values, and
an analysis processor configured to calculate a size of the observation sample based on the analysis image.

7. An image processing method, comprising:
calculating differences of luminance values of pixels in images of an observation sample at different focal depths by a difference calculation processor;
generating a distribution of the differences of the luminance values with respect to the different focal depths by a difference distribution generation processor;
calculating luminance total values by totaling the differences of the luminance values for each pixel column in a first direction of the images;

arranging the luminance total values of each pixel column in a second direction perpendicular to the first direction at the different focal depths to form a plurality of analysis pixel columns;

generating an analysis image based on the plurality of the analysis pixel columns in a diagram having a focal depth axis indicating a focal depth of the images and a positional information axis indicating a position in the second direction, and wherein the analysis image has a color representing the luminance total values; and calculating a size of the observation sample based on the analysis image.

* * * * *